US010769287B2

(12) United States Patent
Roth et al.

(10) Patent No.: US 10,769,287 B2
(45) Date of Patent: *Sep. 8, 2020

(54) FORCED DATA TRANSFORMATION POLICY

(71) Applicant: Amazon Technologies, Inc., Seattle, WA (US)

(72) Inventors: Gregory Branchek Roth, Seattle, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,646

(22) Filed: Jun. 24, 2019

(65) Prior Publication Data
US 2019/0318105 A1 Oct. 17, 2019

Related U.S. Application Data

(63) Continuation of application No. 14/149,725, filed on Jan. 7, 2014, now Pat. No. 10,331,895.

(51) Int. Cl.
*G06F 21/60* (2013.01)
*G06F 21/62* (2013.01)

(52) U.S. Cl.
CPC ........ *G06F 21/602* (2013.01); *G06F 21/6227* (2013.01)

(58) Field of Classification Search
CPC . G06F 21/602; G06F 21/6227; G06F 21/6209
See application file for complete search history.

(56) References Cited

U.S. PATENT DOCUMENTS

| 7,774,329 | B1 * | 8/2010 | Peddy | G06Q 30/02 707/705 |
| 8,117,396 | B1 * | 2/2012 | Fair | G06F 12/0866 709/201 |
| 8,458,494 | B1 * | 6/2013 | Bogorad | H04L 9/30 713/193 |
| 9,355,279 | B1 * | 5/2016 | Takahashi | G06F 21/72 |
| 2003/0041095 | A1 * | 2/2003 | Konda | H04L 67/2823 709/201 |
| 2003/0225801 | A1 * | 12/2003 | Devarakonda | G06F 16/221 |

(Continued)

OTHER PUBLICATIONS

NIST, "Implementation Guidance for FIPS PUB 140-1 and the Cryptographic Module Validation Program," Jan. 10, 2002, 63 pages.

(Continued)

*Primary Examiner* — J. Brant Murphy
(74) *Attorney, Agent, or Firm* — Davis Wright Tremaine LLP

(57) ABSTRACT

Logical data containers of a data storage system are associated with policies that require data transformation of data to be stored in the logical data containers. When a data object is received to be stored in a logical data container, the data object is transformed in accordance with a policy on the logical data container. Transformation of the data object may include encryption. The logical data container may also be associated with a cryptographic key used to perform a required transformation.

20 Claims, 17 Drawing Sheets

(56) References Cited

U.S. PATENT DOCUMENTS

| | | | |
|---|---|---|---|
| 2004/0018844 A1* | 1/2004 | Cheng | H04L 41/12 |
| | | | 455/456.1 |
| 2004/0039741 A1* | 2/2004 | Benson | G06F 21/10 |
| 2004/0230795 A1* | 11/2004 | Armitano | G06F 21/6218 |
| | | | 713/165 |
| 2007/0283119 A1* | 12/2007 | Sarkar | G06F 3/0605 |
| | | | 711/170 |
| 2008/0208926 A1* | 8/2008 | Smoot | G06F 16/217 |
| 2010/0332456 A1* | 12/2010 | Prahlad | G06F 3/0649 |
| | | | 707/664 |
| 2011/0119481 A1* | 5/2011 | Auradkar | G06F 21/602 |
| | | | 713/150 |
| 2012/0166818 A1* | 6/2012 | Orsini | H04L 9/085 |
| | | | 713/193 |
| 2012/0226712 A1* | 9/2012 | Vermeulen | H04L 67/42 |
| | | | 707/770 |
| 2013/0047230 A1* | 2/2013 | Krishnan | H04L 63/102 |
| | | | 726/7 |
| 2013/0254537 A1* | 9/2013 | Bogorad | G06F 21/602 |
| | | | 713/165 |
| 2013/0268740 A1* | 10/2013 | Holt | G06F 21/00 |
| | | | 711/163 |
| 2013/0304616 A1* | 11/2013 | Raleigh | G06Q 20/145 |
| | | | 705/34 |
| 2014/0020072 A1* | 1/2014 | Thomas | H04L 63/0815 |
| | | | 726/7 |
| 2014/0310513 A1* | 10/2014 | Barney | H04L 63/0428 |
| | | | 713/153 |
| 2015/0058629 A1* | 2/2015 | Yarvis | H04L 63/061 |
| | | | 713/171 |
| 2015/0089224 A1* | 3/2015 | Beckman | H04L 63/105 |
| | | | 713/168 |
| 2015/0304306 A1* | 10/2015 | Ponsford | G06F 21/6218 |
| | | | 713/171 |
| 2015/0312243 A1* | 10/2015 | Ponsford | G06F 21/6218 |
| | | | 713/159 |

OTHER PUBLICATIONS

NIST, "Implementation Guidance for FIPS PUB 140-2 and the Cryptographic Module Validation Program," Initial Release Mar. 28, 2003, 205 pages.

Wikipedia, "Disk encryption," Aug. 7, 2018, retrieved Aug. 7, 2018, from https://en.wikipedia.org/wiki/Disk_encryption, 6 pages.

* cited by examiner

FORCED DATA TRANSFORMATION POLICY

CROSS-REFERENCE TO RELATED APPLICATION

This application is a continuation of U.S. patent application Ser. No. 14/149,725, filed Jan. 7, 2014, now U.S. Pat. No. 10,331,895, entitled "FORCED DATA TRANSFORMATION POLICY," the disclosure of which is incorporated by reference herein in its entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

BRIEF DESCRIPTION OF THE DRAWINGS

Various embodiments in accordance with the present disclosure will be described with reference to the drawings, in which.

DETAILED DESCRIPTION

Figure 1:
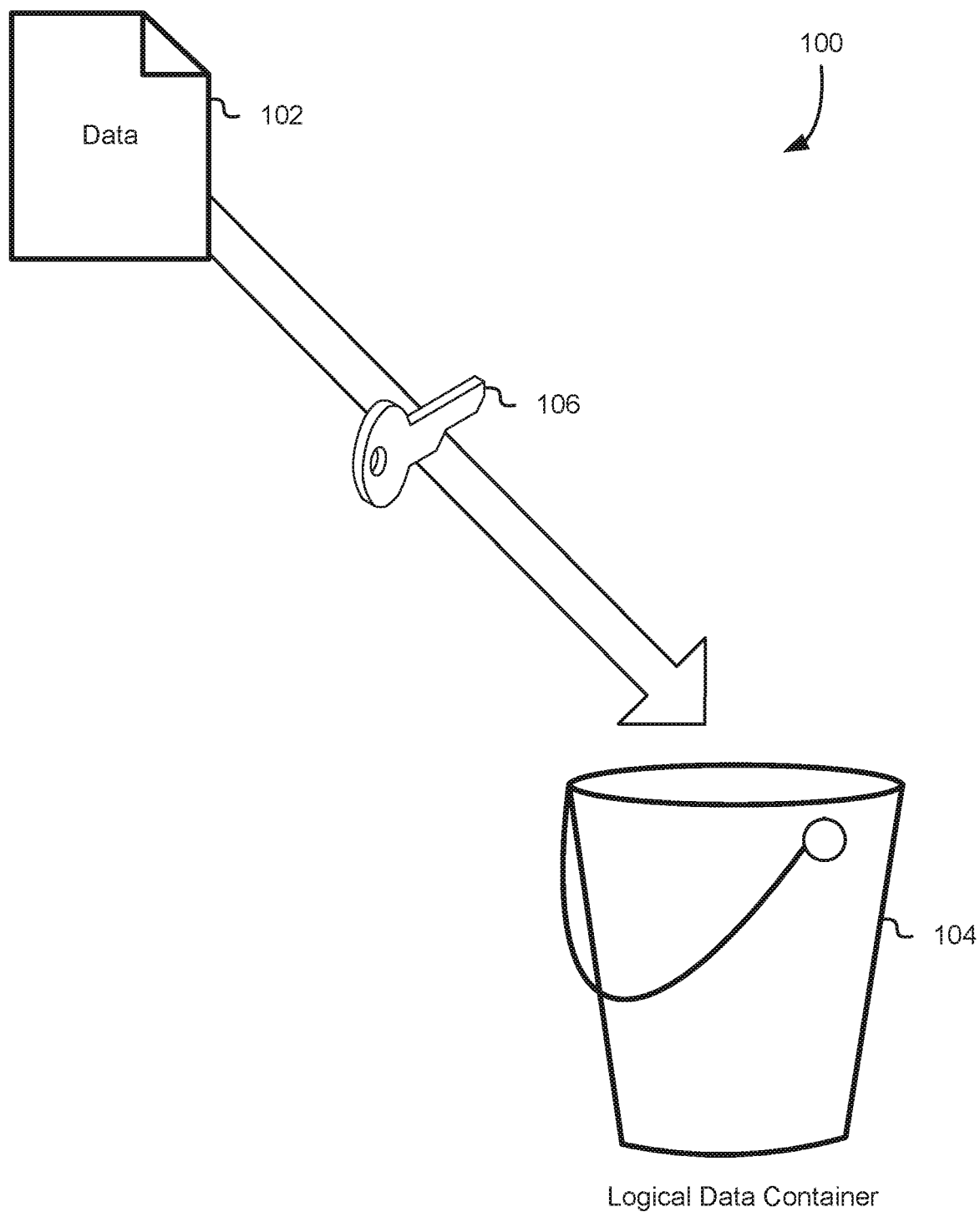
FIG. 1 shows an illustrative diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use of policies that cause the transformation of data involved in the fulfillment of requests. In various embodiments, a computing resource service utilizes logical data containers for various purposes including the organization of data stored by the service. Various associations may be made with the logical data containers that, as a result of the associations, cause certain data transformations to be performed as part of fulfilling requests in connection with the logical data containers. In some examples, a logical data container is associated with a policy that requires data objects, or portions thereof, to be encrypted when stored in the logical data container. Thus, when data objects are uploaded for storage in the logical data container, as a result of association of the logical data container with the policy, the data objects are encrypted. In this manner, use of the logical data container is performed to provide additional security for the data contained therein. While encryption is used throughout the present disclosure for the purpose of illustration, the techniques described herein extend to other data transformations which are not necessarily reversible data transformations.

A policy may provide parameters for data transformations to be performed on data. For example, a policy may specify simply that data is to be encrypted or may specify a specific algorithm to be used for the encryption. In some examples, a policy is further associated with a cryptographic key to be used in application of a data transformation to data. The cryptographic key may be a public key of a public-private key pair, a symmetric cryptographic key, or otherwise. Further, the policy may specify a cryptographic key by an identifier of the key to be used by another system (i.e., a system different than the system fulfilling a request to which the policy applies) in performing at least a partial role in the data transformation. The other system may be another service of a service provider. In this manner, customers of the service provider on behalf of whom logical data containers are maintained are provided control over how data transformations are performed.

In various embodiments of the present disclosure, the techniques described and suggested herein extend to the application of data transformations based at least in part on features of requests and/or features of data responsive to requests. For example, the techniques described and suggested herein may cause data to be transformed when provided in response to requests transmitted from certain network and/or geographic locations or, alternatively, from outside of specified network and/or geographic locations. As an illustrative example, data may be redacted when being provided in response to requests from another country while the same data may be unredacted when provided in response to requests from the same country from which the data is being provided. Generally, features of a request to which data is provided in response may cause the data to be transformed in a manner different from a way in which the data would be transformed (if at all) for a response to another request with different features. As noted, a determination whether to apply a transformation and/or the particular transformation to apply may be also based at least in part on data responsive to the request. For example, data of at least certain size (which may be measured in bytes, number of records, or otherwise) may be transformed in one way and data of less than the certain size may be left untransformed or transformed in another way. As another example, data containing field values or identifiers matching a pattern (e.g., indicative of a credit card number, social security number, or other information specified as sensitive), may be transformed while other data is left untransformed or transformed in a different manner.

FIG. 1 shows an illustrative example of a diagram 100 illustrating various aspects of the present disclosure. In an embodiment, data 102 is transmitted for the purpose of storage in a data container 104. The data for example may be in the form of a data object transmitted by a user of a computing resource service provider for processing thereby where the processing may include performing various operations in connection with the data such as storing the data. The data container 104 may be or otherwise correspond to a logical data container which, in some embodiments, has an identifier with which data is associable in a computing resource service provider computing environment with the identifier for the purpose of organization of data. A logical data container may be a resource of the computing resource service provider that is configurable and definable by customers of the computing resource service provider using an application programming interface (API). Data objects stored in association with identifier may be said to be stored in the data container. The association may be maintained in any suitable manner, such as by way of a database that associates data objects with corresponding data containers. In various embodiments, a computing resource service provider provides data storage services in manner that enables the storage of multiple data objects in data container, although some data containers may contain zero or one data objects. Further, logical data containers may be identifiers or may have additional structure. For example, logical data containers considered as being within the scope of the present disclosure include queues, databases, and other mechanisms for storing data in an organized manner.

Further, logical data containers, in some embodiments, may themselves contain logical data containers. As an example, a data storage service may provide uniform resource identifiers for data objects to use to reference logical data containers and objects contained therein. A URI for a data object may contain an identifier of the logical data container and an identifier of the data object. URIs for data objects in the same logical data container may contain the same identifier of the logical data container but different identifiers for the different objects. In this manner, the URIs for the data objects of a logical data container may form a namespace. A subspace of the namespace may be considered as a logical data container. Similarly, databases may have sub-databases and, generally, other types of logical data containers may store data objects and certain subsets of the data objects may be categorized as being in logical data containers corresponding to the subsets.

As discussed in more detail below, customers of a computing resource service provider may utilize an interface, such as a graphical user interface provided in the form of a web page of the service provider to create data containers thereby enabling data to be stored in the created data container. In various examples of embodiments of the present disclosure, a data container is associated with a cryptographic key 106, which may also be simply referred to as a key. The association may be created for example by a policy or other declaration on the data container 104. As a result of the association, in an embodiment, a consequence of data being transmitted to the service provider for storage in the data container 104 is that the data is encrypted using the cryptographic key 106. The encryption may occur regardless of one or more parameters set inside a request to store the data 102 in the data container 104. For example, despite an application programming interface (API) providing an ability to indicate in requests whether data should be encrypted, a request to store the data 102 in the data container 104 may lack an indication that the data 102 should be encrypted for storage in the data container 104. Because of the association of the data container 104 with the cryptographic key 106 the data may nevertheless be encrypted by a computing device of the service provider using the cryptographic key 106. Similarly, if a request to store the data 102 in the data container 104 includes a request parameter indicating that the data should be processed in a certain way, such as encrypted in a certain way because of the association of the data container 104 with the cryptographic key 106, the data 102 may be encrypted in a manner that conflicts with the request parameter because of requirements of policy causing the association of the data container 104 with the cryptographic key 106. As discussed in detail below, various embodiments of the present disclosure employ numerous variations and are applicable to other types of data transformations instead of or in addition to encryption.

Figure 2:
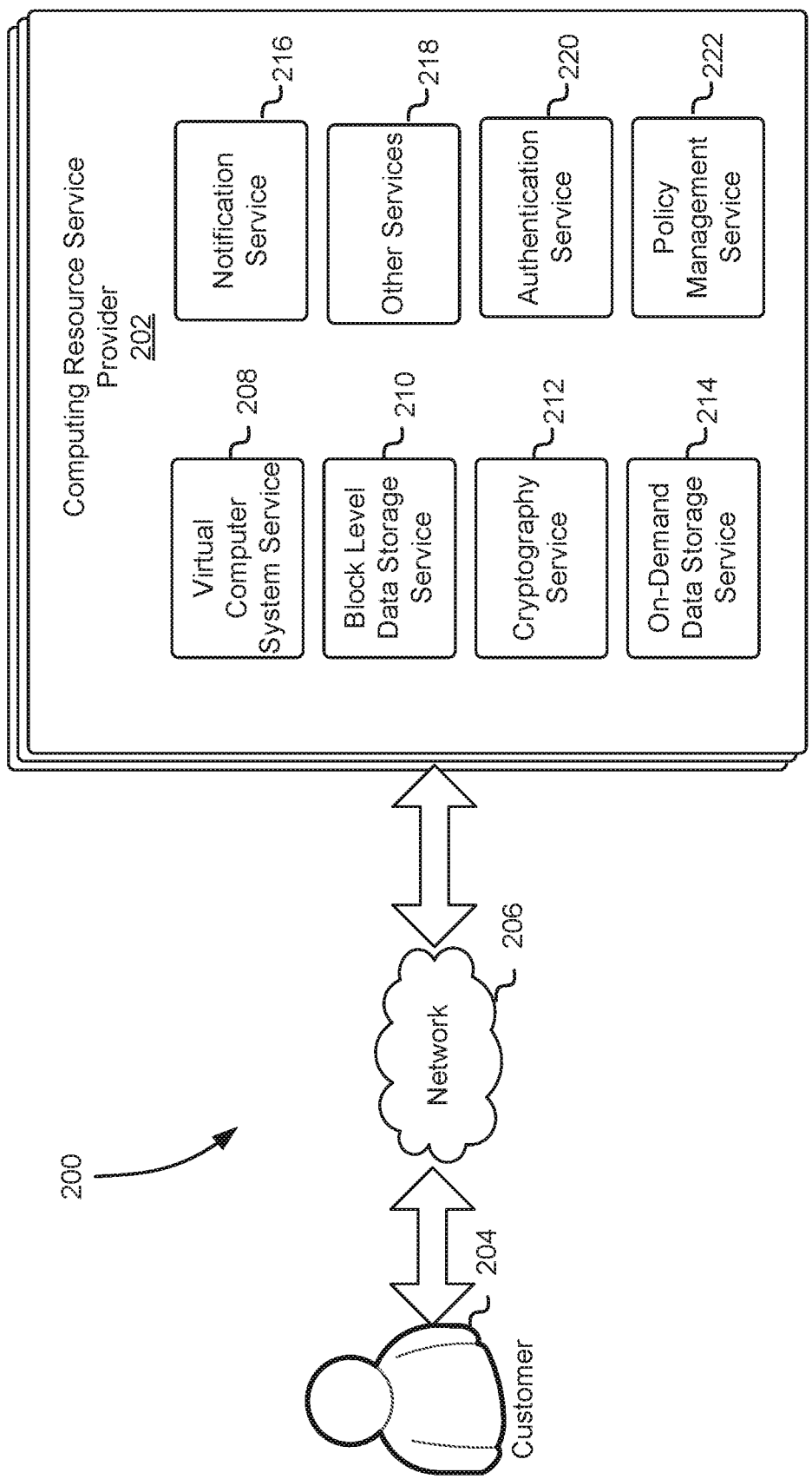
FIG. 2 shows an illustrative example of an environment in which various embodiments can be practiced.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to maintain and deliver information to its employees, which may be located in various geographical locations. Additionally, the customer 204 may be an individual that could utilize the various services to deliver content to a working group located remotely. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. The services provided by the computing resource service provider, in this example, include a virtual computer system service 208, a block-level data storage service 210, a cryptography service 212 (also referred to as a key management service), an on-demand data storage service 214 and one or more other services 218, although not all embodiments of the present disclosure will include all such services and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service and/or to access one or more block-level data storage devices provided by the block data storage service). In some embodiments, the customers and services utilize the same interface to submit requests to a service.

The virtual computer system service 208 may be a collection of computing resources (e.g., collection of devices) configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

The block-level data storage service 210 may comprise a collection of computing resources that collectively operate to store data for a customer 204 using block-level storage devices and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

As illustrated in FIG. 2, the computing resource service provider 202 may operate a cryptography service 212, which is described in more detail below in connection with FIG. 3. Generally, the cryptography service may be a collection of computing resources collectively configured to manage and use cryptographic keys for customers of the computing resource service provider. Keys used by the cryptography service 212 may have associated identifiers that the customers can reference when submitting requests to perform cryptographic operations (such as encryption, decryption and message signing) and/or other operations, such as key rotation. The cryptography service may securely maintain the cryptographic keys to avoid access by unauthorized parties. Customers and/or other services of the computing resource service provider may specify, using key identifiers, keys to be used in performing cryptographic operations. Further, the cryptography service 212 may perform cryptographic operations using an implicitly defined (e.g., default) key for a customer and/or service. As an example, a data storage service may submit requests to the cryptography service 212 to encrypt encryption keys used to encrypt data stored by the data storage service and the cryptography service 212 may use a default master key for the data storage service.

The computing resource service provider 202 may also include an on-demand data storage service. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects which may be used by the customer 204 to retrieve or perform other operations in connection with the data objects stored by the on-demand data storage service 214. The on-demand data storage service 214 may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

In the environment illustrated in FIG. 2, a notification service 216 is included. The notification service 216 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes such as monitoring applications executing in the virtual computer system service, workflow systems, time-sensitive information updates, mobile applications, and many others.

The computing resource service provider 202 may additionally maintain one or more other services 218 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As illustrated in FIG. 2, the computing resource service provider 202, in various embodiments, includes an authentication service 220 and a policy management service 222. The authentication service, in an embodiment, is a computer system (i.e., collection of computing resources) configured to perform operations involved in authentication of users of the customer. For instance, one of the services may provide information from the users to the authentication service to receive information in return that indicates whether or not the user requests are authentic. Determining whether user requests are authentic may be performed in any suitable manner and the manner in which authentication is performed may vary among the various embodiments. For example, in some embodiments, users electronically sign messages (i.e., computer systems operated by the users electronically sign messages) that are transmitted to a service. Electronic signatures may be generated using secret information (e.g., a private key of a key pair associated with a user) that is available to both an authenticating entity (e.g., user) and the authentication service. The request and signatures for the request may be provided to the authentication service which may, using the secret information, compute a reference signature for comparison with the received signature to determine whether the request is authentic. Message verification may also be performed using asynchronous cryptography and the keys used by the various parties may be selected accordingly.

If the request is authentic, the authentication service may provide information to the service that the service can use to determine whether to fulfill a pending request and/or to perform other actions, such as prove to other services, such as the cryptography service, that the request is authentic, thereby enabling the other services to operate accordingly. For example, the authentication service may provide a token that another service can analyze to verify the authenticity of the request. Electronic signatures and/or tokens may have validity that is limited in various ways. For example, electronic signatures and/or tokens may be valid for certain amounts of time. In one example, electronic signatures and/or tokens are generated based at least in part on a function (e.g., a Hash-based Message Authentication Code) that takes as input a timestamp, which is included with the electronic signatures and/or tokens for verification. An entity verifying a submitted electronic signature and/or token may check that a received timestamp is sufficiently current (e.g., within a predetermined amount of time from a current time) and generate a reference signature/token using for the received timestamp. If the timestamp used to generate the submitted electronic signature/token is not sufficiently current and/or the submitted signature/token and reference signature/token do not match, authentication may fail. In this manner, if an electronic signature is compromised, it would only be valid for a short amount of time, thereby limiting potential harm caused by the compromise. It should be noted that other ways of verifying authenticity are also considered as being within the scope of the present disclosure.

The policy management service 222, in an embodiment, is a computer system configured to manage policies on behalf of customers of the computing resource service provider. The policy management service 222 may include an interface that enables customers to submit requests related to the management of policy. Such requests may, for instance, be requests to add, delete, change or otherwise modify policy for the customer or for other administrative actions, such as providing an inventory of existing policies and the like. The policy management service 222 may also interface with other services to enable the services to determine whether the fulfillment of a pending request is allowable according to policy corresponding to the customer for which the request was made. For example, when a service receives a request, the service (if it has not locally cached such information) may transmit information about the request (and/or the request itself) to the policy management system which may analyze policies for the customer to determine whether existing policy of the customer allows fulfillment of the request and provide information to the service according to the determination.

It should be noted that, as with all embodiments explicitly illustrated herein, variations are considered as being within the scope of the present disclosure. For example, some or all operations performed by the authentication service 220 and policy management service 222 may be combined into a single service. A single service may, for example, receive requests to verify pending customer requests and, as part of verifying pending customer requests, may determine whether electronic signatures are valid and whether any applicable policies prevent fulfillment of the request (or whether any applicable policies allow fulfillment of the request where such is required for fulfillment). Further, one or more operations performed by the authentication service 220 and/or the policy management service 222 may be performed by other services themselves without communication with the authentication service 220 or policy management service 222. Services may, for instance, have their own authentication and/or policy evaluation engines, where the authentication and/or policy evaluation engines may be updated by a central authentication service 220 and/or policy management service 222.

As discussed above, various embodiments of the present disclosure are directed to providing cryptography services. Cryptography services may be provided by a cryptography service system such as described above, FIG. 3 accordingly shows an illustrative example of a cryptography service 300 in accordance with various embodiments. As illustrated in FIG. 3 and as discussed above, the cryptography service 300 is logically comprised of a frontend system and a backend system. Both the frontend system and the backend system may be implemented by one or more computer systems configured to perform operations described herein. For example, as illustrated in FIG. 3, the frontend system of the cryptography service 300 implements a request API and a policy configuration API. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:
CreateKey(KeyID)
Encrypt(KeyID, Data, [AAD])
Decrypt(KeyID, Ciphertext, [AAD])
Shred(KeyID)
ReKey(Ciphertext, OldKeyID, NewKeyID).

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed.

Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeysID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeros or ones or a random string). If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection the Create (KeyID) request described above. In some embodiments, the ReKey operation may be operable to cause data to be transferrable between isolated instances of a cryptography service. In some embodiments, a policy might permit a rekey operation to be performed on a ciphertext but might not permit the same requester to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key)

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions (e.g., by encoding an access control list (ACL) or portion thereof) that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments the ciphertext may be generated in a manner that will prevent the cryptographic service from returning a decrypted version to the customer.

Figure 3:
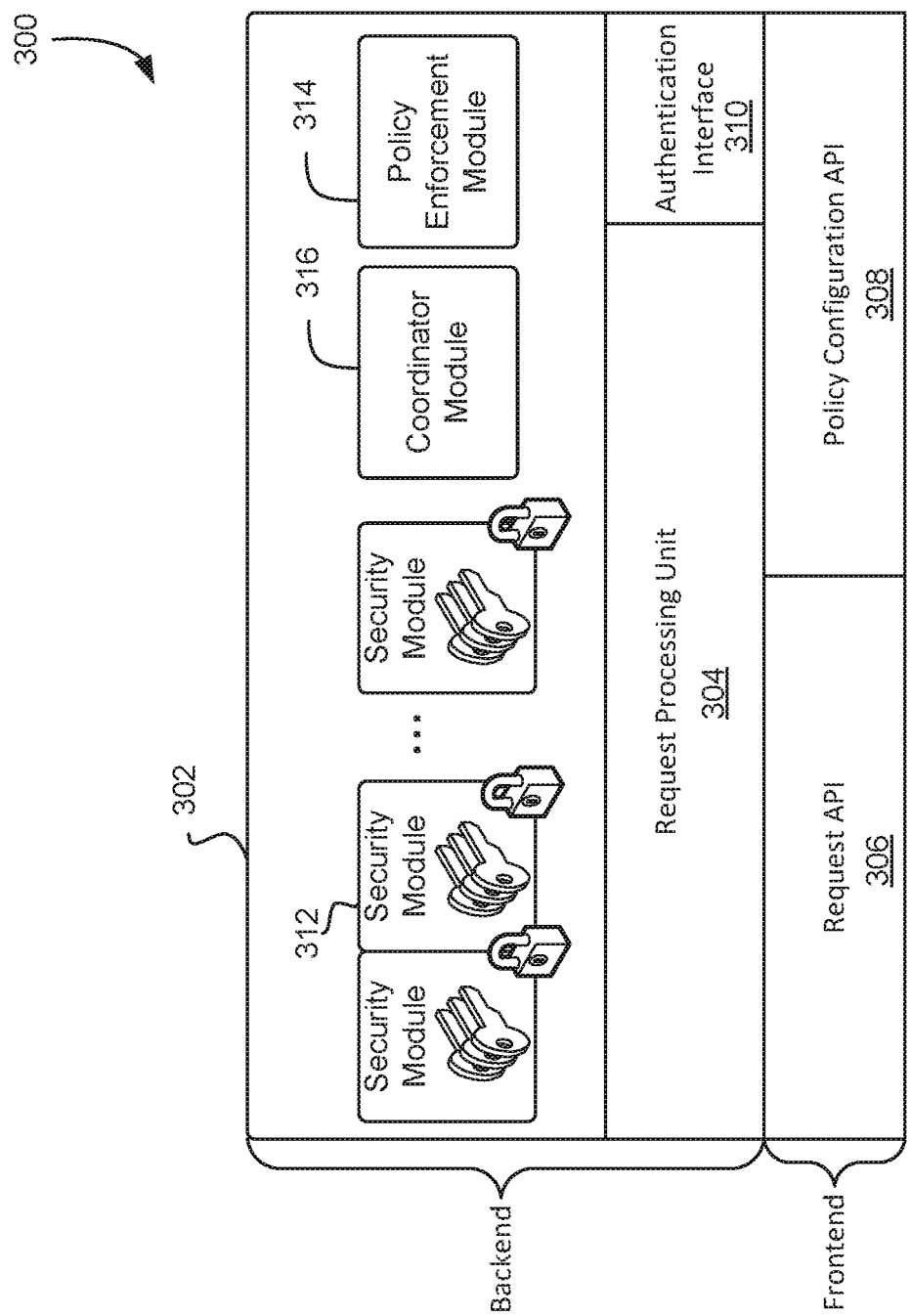
FIG. 3 shows an illustrative example of a cryptography service in accordance with at least one embodiment.

As illustrated in FIG. 3, the cryptography service 300 includes a backend system 302 that itself comprises various components in some embodiments. For example, the backend system in this example includes a request processing system (unit) 304 which may be a subsystem of the cryptography service 300 that is configured to perform operations in accordance with requests received through either the request API 306 or the policy configuration API 308. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 310 which enables the request processing unit to determine whether requests are authentic. The authentication interface may be configured to interact with an authentication service such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 300 also, in this illustrative example, includes a plurality of a security modules 312 (cryptography modules), a policy enforcement module 314, and a coordinator module 316. Returning to FIG. 3, one or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 300 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 300 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as a policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 3 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Figure 4:
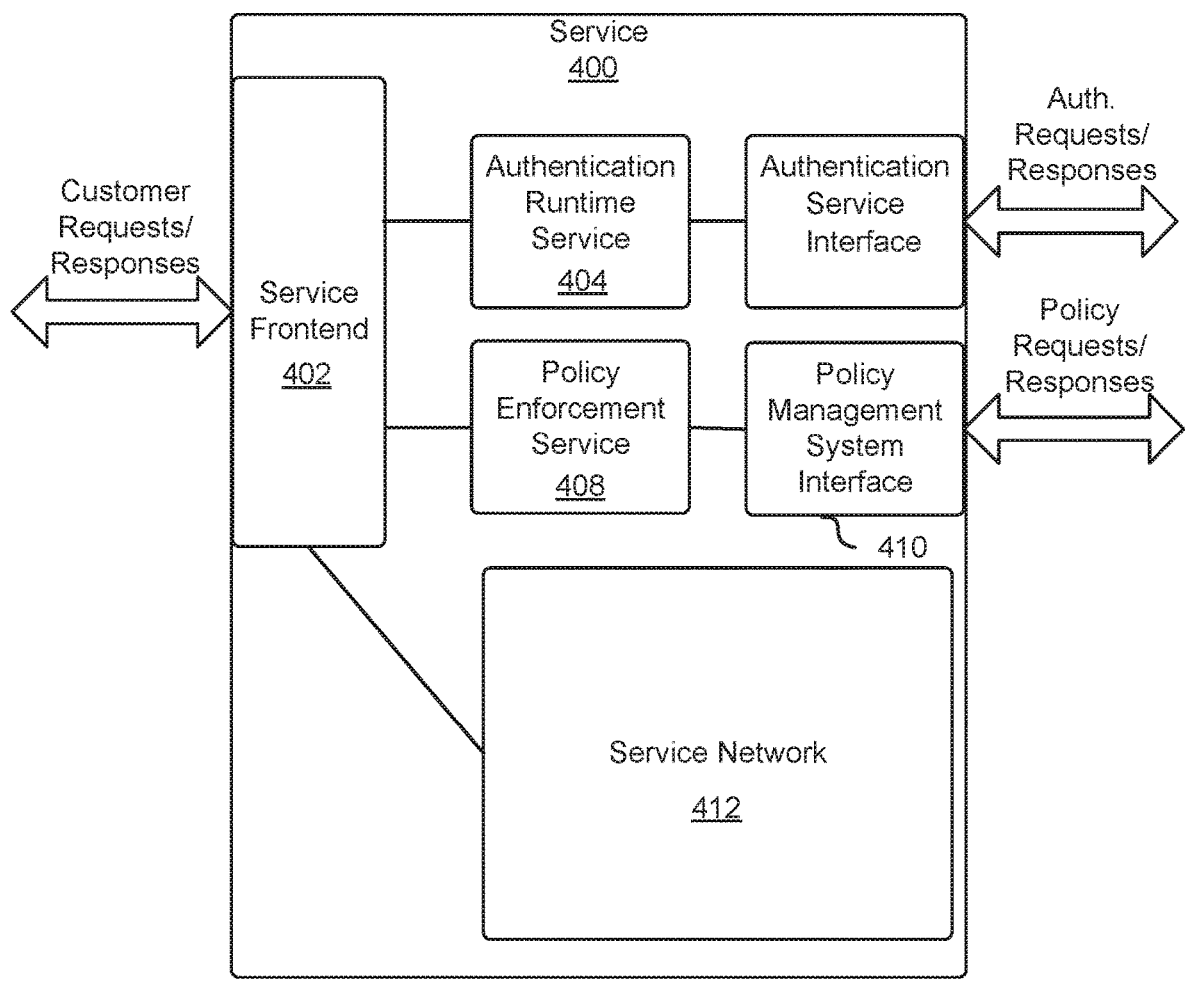
FIG. 4 shows an illustrative example of a service in accordance with at least one embodiment.

As illustrated in FIG. 4 the service frontend 402 also communicates with a policy, enforcement service 408 in order to determine whether to fulfill certain requests. The policy enforcement service 408 may be a subsystem of the service 400 that comprises the collection of computing resource collectively configured to enable the service frontend 402 to determine whether to fulfill or deny requests. As with the authentication runtime service 404, the policy enforcement service 408 may communicate with a policy management system (not illustrated in the figure) for the purpose of determining whether fulfillment of a request is in compliance with the policy. For example, when the service frontend 402 receives a request, it may transmit the request or information based at least in part on the request to the policy enforcement service 408. The policy enforcement service 408 may transmit information, via a policy management system interface 410, to a policy management system in order to make the determination. As with the authentication runtime service 404, the policy enforcement service 408 may cache various information in order to enable determinations of whether fulfillment of requests comply with policies without communicating with the policy management system.

In various embodiments, the service frontend 402 also communicates with a service network 412 when received requests are determined to be both authentic and fulfillable in compliance with policy. The service network 412 may be a subsystem of the service 400 comprising a collection of computing resources configured to operate in support of providing a service. For example, in an embodiment whether the service 400 is a virtual computer system service, the service network 412 may comprise a plurality of physical host computing devices that implement virtual computer systems on behalf of customers of the service 400. Requests through the service frontend 402 may relate to operation of the virtual computer systems implemented using the service network 412. For instance, requests may be submitted to the service frontend 402 for the purpose of provisioning, deprovisioning, modifying, or otherwise remotely managing virtual computer systems. In the example of a block data storage service, the service network 412 may comprise a collection of data storage servers with corresponding data storage devices. The service frontend 402 may interact with the service network 412 for various purposes such as allocating storage space to customers, deallocating storage space for customers, and generally in connection with management of one or more virtual block level data storage devices provided by the service 400. In the example of a cryptography service, the service network 412 may include various hardware devices that enable the secure management of cryptographic keys. For example, the service network 412 may comprise a plurality of security modules (e.g., hardware security modules) which may be devices that securely store cryptographic key material. The service network for a cryptography service may also include data storage devices for storing keys on behalf of customers and generally other devices supporting operation of the cryptography service. In the example of an on-demand data storage service, the service network 412, as with the block data storage service, may include data storage servers and corresponding data storage devices. The service network may also include one or more databases in order to operate as key value stores to enable the efficient location of data within the service network 412. The service network 412 may also include other devices (e.g., server computer systems), such as devices that operate to durably, i.e., redundantly store data to perform garbage collection processes and the like. Generally, the service network 412 may include computing resources applicable to the service being provided. Also, while not illustrated, the service network 412 may include appropriate networking devices such as routers, switches, load balancers, and other devices that enable the collective operation of the devices in the service network 412. Of course, the exact resources that are included and their collective configuration will vary in accordance with the various services and the various embodiments in which they are implemented.

Figure 5:
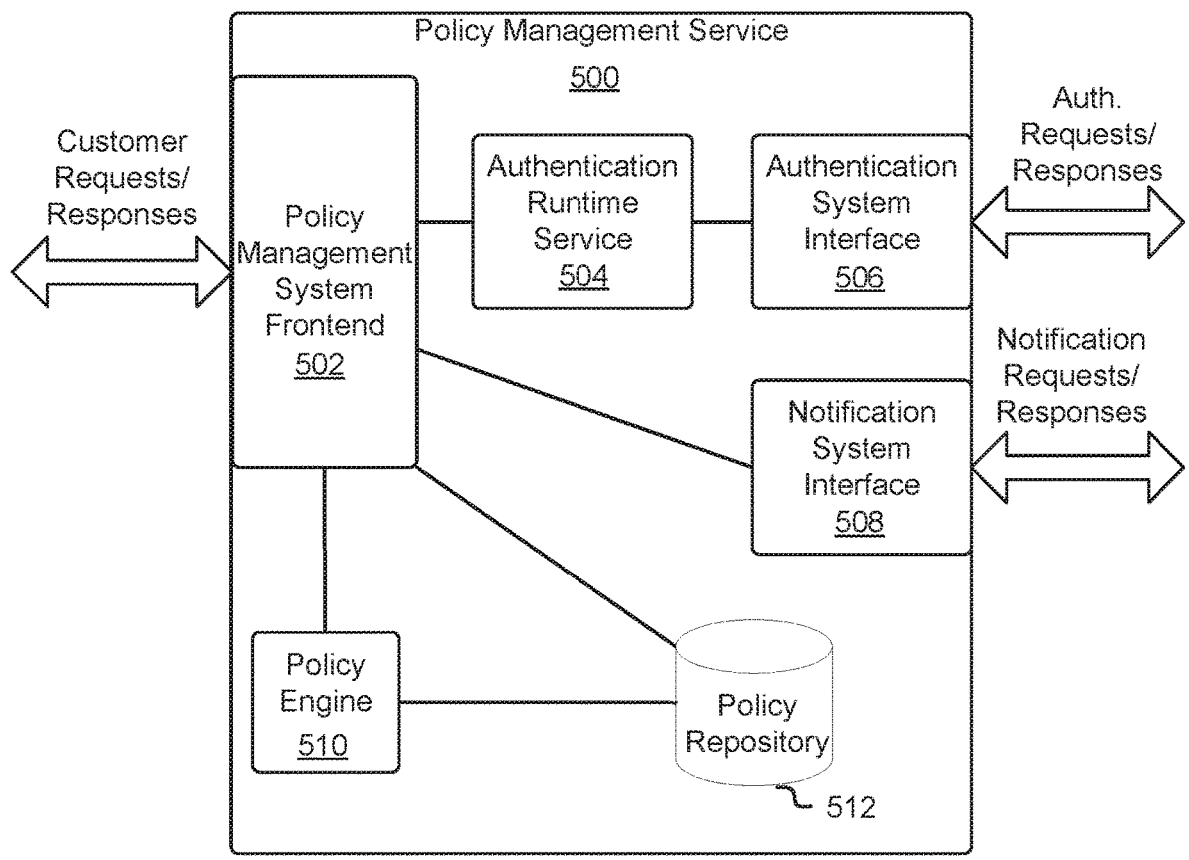
FIG. 5 shows an illustrative example of a policy management service in accordance with at least one embodiment.

FIG. 5 shows an illustrative example of a policy management service 500 in accordance with various embodiments. As illustrated in FIG. 5 the policy management service 500 includes a policy management system frontend 502. The policy management system frontend 502 may be configured such as the service frontend 402 described above in connection with FIG. 4. In particular, the policy management system frontend 502 may be configured to receive customers' requests and provide responses to those requests. The policy management system frontend 502 may also be configured to receive requests from other services, such as for determinations whether requests are fulfillable according to policy. Requests to the policy management system frontend 502 may be various requests in connection with the management of policy or an account of a computing resource provider. For example, a request to the policy management system frontend may be an appropriately configured API call to add a policy, to delete a policy, to change a policy, and generally to perform various actions in connection with policies, such as providing an inventory of policies and the like. Addition and/or change of policy may be accomplished through the receipt of definitions of policies, which may comprise structured sets of information specifying parameters that define corresponding policies. Generally, the policy management system frontend 502 may receive indications of policies, where the indications are definitions of policies themselves (i.e., are encodings of policies in requests), where the indications refer to predefined policies or policies, which may be updated over time (e.g., in accordance with changes made to one or more compliance regimes, such as described below). An illustrative example of how a policy may be organized is discussed below in connection with FIGS. 6-7. Further, while various techniques described herein are illustrated with respect to customers providing their own policies, the policy management system frontend 502 (or another subsystem) may be used by the computing resource service provider to receive indications of policies on behalf of customers. For example, the computing resource service provider may enter into an agreement with a customer whereby the computing resource service provider agrees to manage data in compliance with one or more compliance regimes, such as described below. To comply with the agreement, the computing resource service provider may utilize the policy, management system to make effective one or more data transformation (and/or other) policies that enable the computing resource service provider to manage data of the customer in compliance with the compliance regime.

As with other frontend systems described herein, the policy management system frontend 502 may include one or more webservers that perform different operations. For example, in an embodiment, the policy management system frontend 502 may include a webserver that provides, over a network such as the Internet, a console interface for managing policies. The console interface may be a graphical user interface (GUI) with various GUI controls that allow users to perform various actions in connection with the management of policy. Example actions include the definition of policies and submission of defined policies. A user may, for instance, use various GUI controls (drop down menus, check boxes, text entry boxes and the like) for defining a policy and then interact with the GUI to cause the webserver to submit the defined policy. Submission of the defined policy in a request (or, generally, submission of any request transmitted via the GUI), may cause the request to be transmitted from the webserver providing the GUI to another webserver that orchestrates the processing of the requests, such as described below. The other webserver may also be available to customers for submission of requests directly instead of through the webserver providing the GUI. Other variations are also considered as being within the scope of the present disclosure.

As with the service 400 described above in connection with FIG. 4, the policy management service 500 may include an authentication runtime service 504 and an authentication system interface 506 in order to enable the policy management system frontend 502 to fulfill or deny requests as appropriate. As with the service frontend 402, the policy management system frontend 502 may interact (e.g., via appropriately configured communication signals) with various components in order to provide policy management services. For example, as illustrated in FIG. 5, the policy management system frontend 502 may utilize a notification system interface 508 to communicate with a notification system such as described above. The notification system may be used in order to alert users associated with an account of certain types of activity in connection with one or more policies of the account. For example, as noted in more detail below, attempted additions to a set of policies for the account may cause the policy management system frontend 502 to cause the notification system to provide one or more notifications of the attempted policy addition. In this manner, receipt of the notification enables appropriate action to be taken such as when addition of a policy is improper.

The policy management system frontend 502, in an embodiment, utilizes a policy engine 510 which may be a subsystem of the policy management service 500 comprising a collection of computing resources collectively configured to evaluate policy. The policy engine 510 may receive from the policy management system frontend 502 a request that has been received and/or information based at least in part thereon. The policy engine 510 may identify any policies applicable to the request, evaluate whether fulfillment of the request is in compliance with any applicable policies, and provide notification to the policy management system frontend 502 whether fulfillment of the request is in compliance with existing policy. The policy engine 510 may operate in various ways in accordance with various embodiments. For instance, as discussed below, policies may be encoded in policy documents which encode various information regarding principals, such as users, and conditions for the principals' access to computing resources such as cryptographic keys, data objects, logical containers for data objects and other items to which policies apply. The policy engine (or another system working in concert with the policy engine) may use the information in the policies to determine which of a set of policies apply to a particular request. For example, if a request is submitted by a particular identity identified in the request, the policy engine may select policies applicable to that entity. If the request involves a particular resource, the policy engine may select policies that are applicable to the particular resource. In addition, as discussed in more detail below, policy documents may include information that is indicative of whether the policy document is currently effective (i.e., whether one or more policies encoded in the policy document are currently enforced), such as information indicating time when effectiveness of one or more policies encoded in the policy documents begins. Identifying applicable policy documents may include selecting policy documents that are in force and disregarding policy documents that are not in force.

The policy engine may sequentially or otherwise process the policies to determine whether each of the selected policies allow fulfillment of the request. The policy engine may transmit a notification (e.g., in the form of a response to a request to evaluate policy submitted by the policy management frontend system 502) to the policy management frontend system 502 that indicates whether the set of policies for an account corresponding to the policies allows or precludes fulfillment of the request. Additional information, such one or more reasons fulfillment of the request is precluded by policy (e.g., information identifying one or more policies that would be violated by fulfillment of the request and/or information based at least in part on the policies that would be violated by fulfillment of the request).

To enable large scale policy management for multiple users, the policy management service 500 may include a policy repository 512 which may comprise one or more data storage devices that store policy documents that encode policies of the various accounts of computing resource service provider. In some embodiments, the policy repository 512 stores policies for multiple entities (e.g., customers of a computing resource service provider) and, accordingly, stores policies in direct or indirect association with the entities to which the policies correspond.

As illustrated in FIG. 5, the policy management system frontend 502 upon receipt of a request may utilize the authentication runtime service 504 to determine whether the request is authentic. If the request is authentic, the policy management system frontend 502 may submit a policy evaluation request to the policy engine 510 to determine whether the request is in compliance with applicable existing policy. The policy engine 510, if it does not have such information cached, may interact with the policy repository 512 in order to obtain applicable policies. The policy engine 510 may, for example, access all policies for an account associated with the request from the policy repository 512 and identify from the access policies any policies which are applicable to the request. As noted, the policy engine may cache policies in order to avoid communication with the policy repository 512 which may be implemented across a network from the policy engine 510.

For certain types of requests, the policy management system frontend 502 may interact with the policy repository 512. For example, if such actions are allowed by existing policy the policy management system frontend 502 may transmit new policies to the policy repository 512, may transmit commands to the policy repository 512 to delete one or more policies, and/or generally to change a set of policies or an account associated with the request (e.g., by modifying an existing policy).

As noted above, various policies utilized by customers of a computing resource service provider may be encoded in the form of policy documents. The policy document in an embodiment is a document, i.e., organized collection of information, that operates as a container for one or more statements. The policy document may be a Javascript Object Notation (NON), an eXtensible Markup Language (XML) document, another document using a structured markup language, or other way of organization information. It should be noted that a policy document may encode one or more policies that are defined by corresponding statements. It should also be noted that a policy may include one or more sub-policies. In other words, a policy may comprise a collection of policies. For example, an account of a computing resource service provider may have a policy for a data storage service ("data storage service policy") that comprises a plurality of individual policies, each defining a specific permission. Additionally, it should be noted that the term "policy" may have different meanings in different contexts. As an example, the term "policy" can have a different meaning when used as an uncountable (mass) noun than when used as a countable (count) noun. For instance, a phrase such as "whether policy allows fulfillment of a request" may be interpreted to mean whether a collection of individual policies allows fulfillment of the request. A statement may include conditions which may be any restrictions or details about the statement. The conditions, for example, may specify circumstances for a policy to be in effect.

While policy documents are used for the purpose of illustration, other ways of encoding policies (e.g., by using relational tables of a relational database to store the various information that would be encoded by a policy document and, generally, any mechanism wherein policy declarations may be maintained) may be used in accordance with various embodiments.

In various embodiments, policies are able to define conditions for changing a set of policies, such as a set of policies for an account of a computing resource service provider. A policy on policy addition (which may be referred to as a "policy addition policy") may require that, to be fulfillable, a request to add a proposed policy to a set of policies must be configured such that the proposed policy will not become effective (i.e., be enforced by a system that enforces the set of policies) until a future time, such as a specified number of hours into the future measuring from some reference point in time. The policy on policy addition may define the set of principals to which the policy applies, the resources to which the policy applies, one or more other conditions that must be fulfilled, and one or more actions in addition to denial if the conditions are not fulfilled (or, alternatively, allowance if the conditions are fulfilled). An additional action defined by the policy may, for instance, include one or more actions that result in notification of one or more principals of a request to add a policy. A policy administrator may, for instance, allow one or more others to add policies to a set of policies, but may configure a policy on policy addition such that the policy administrator can add policies without a required delay, but the allowed one or more others can only successfully add policies if the policies are added so as to become effective in compliance with a required delay.

Figure 6:
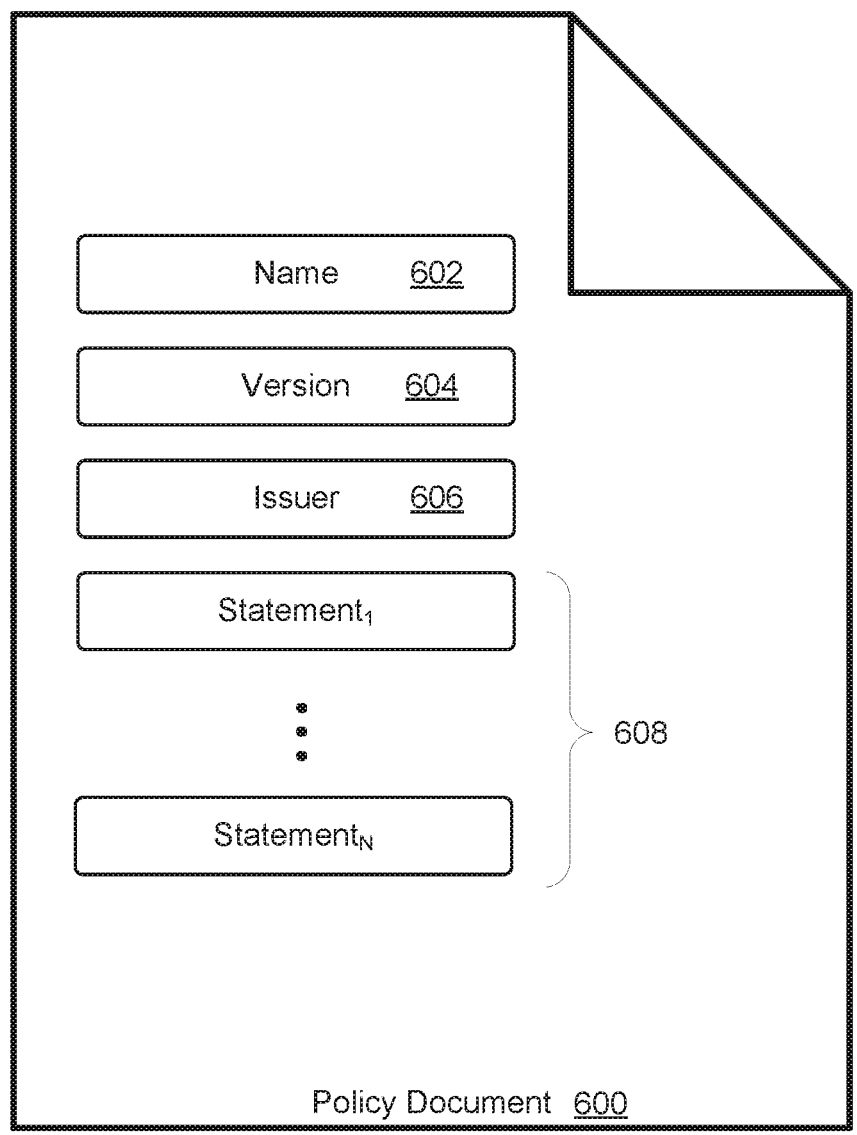
FIG. 6 shows an illustrative example of a policy document in accordance with at least one embodiment.

FIG. 6 shows an illustrative example of a policy document in accordance with an embodiment. In an embodiment, the policy document 600 encodes various information relevant to a policy encoded by the policy document. The policy may be encoded in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a request to be fulfillable. As illustrated in FIG. 6, the policy document 600 includes a name 602 which may comprise a string for the policy document 600. The name 602 may, for instance, be used to provide a convenient identifier in using human readable terms. As an example, a name 602 may be a string, for instance, to the effect of "MyDataStoragePolicy." Also as illustrated in FIG. 6, the policy document 600 may include a version 604. The version 604 may be used to track how the policy document 600 changes over time as various requests are received and fulfilled to update policy. Each update to the policy document 600 may cause the version 604 to be updated to a new value. The policy document 600 may also include an issuer 606 which may be an identifier for a user that submitted a request that resulted in creation of the policy document 600 having the current version.

As illustrated in FIG. 6 and noted above, the policy document 600 may include one or more statements 608. Statements in a policy document may be processed using a logical OR. As discussed in more detail below, one or the statements 608 may encode information that indicates a future time when the policy encoded by the policy document 600 is to be effective. For example, the statement may encode a time stamp for a future time at which the policy encoded by the policy document 600 is to be effective. A statement may encode a duration indicating an amount of time that must pass before which the policy document 600 is to be effective where the duration may be measured from some point in time, which may be a global time (e.g., Unix time) or which may be measured from a particular event, such as submission of a request to add a policy that contains the statement or approval of the policy by a policy management system. Generally, the statement may encode any information that immediately or eventually renders determinable a future time at which the policy encoded by the policy document 600 becomes effective. It should be noted that statements may also contain additional information that is not illustrated in the figure, such as a statement identifier that uniquely, identifies the statement (globally or within the policy document), and other information which may be used by a policy management system.

Figure 7:
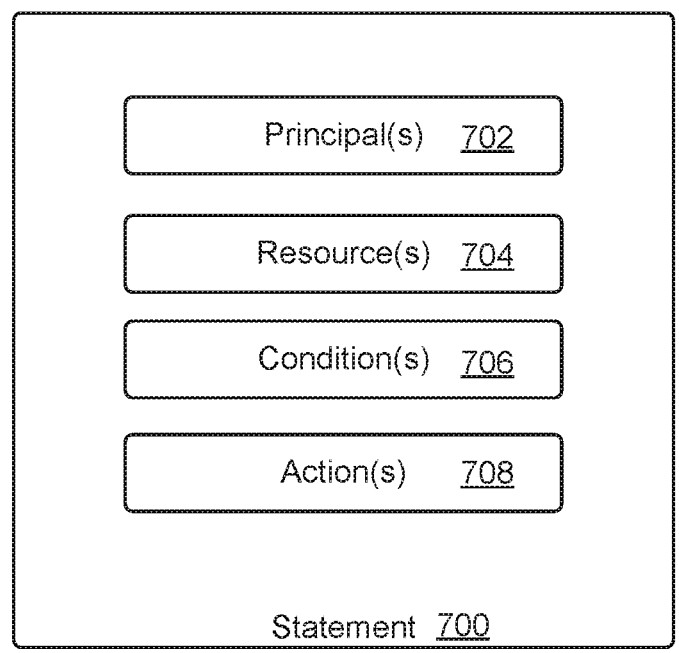
FIG. 7 shows an illustrative example of a policy statement in accordance with at least one embodiment.

As noted above, a statement may be a formal description for a permission or, generally, a formal description of one or more conditions on access to one or more resources. FIG. 7 accordingly, shows an illustrative example of a statement 700 which may be encoded in a policy document, such as described above. As illustrated in FIG. 7, the statement 700 may include information identifying one or more principals 702. A principal may be an entity (e.g., user, computer system, or any entity that may be granted a permission for access to a system or resource within a system) to which the statement 700 applies. As an example, a customer of a computing resource service provider may have an account. The account may be associated with multiple subaccounts each corresponding to a user of the customer. Each user may have a corresponding identifier which may be includable as a principal in a statement. Principals may also be identified in other ways. For example, sets of principals may be identified by an identifier for the set. As an illustrative example, a department in an organization may have a corresponding identifier. A statement may be applicable to the users associated with the department by listing in the statement an identifier for the department. Identifiers for sets of principals may be useful, for instance, when the sets are dynamically changing such as when employees are hired by and/or leave an organization and/or department therein. Generally, sets of principals may be defined based at least in part on characteristics of principals. Identifiers of principals may also be open ended. For example, information may be included that indicate that the statement 700 is applicable to anyone, that is to all users capable of submitting a request on behalf of an account of a computing resource service provider or, generally, all users.

As illustrated in FIG. 7, a statement 700 also identifies one or more resources 704. Resources may be computing resources such as described above. Resources may, for instance, be the subject of the services provided by a computing resource service provider. As an example, a resource may be a virtual computer system, may be a logical data container used to associate data objects together, may be a volume identifier of a block level data storage device, a database, an item stored in a database, a data object (e.g., file) and generally any type of resource which may be provided as a service. In some embodiments, the resources are cryptographic keys, such as cryptographic keys managed by a cryptography service on behalf of customers and/or cryptographic keys used as default keys for one or more data storage services. As with principals, resources may be described using identifiers of sets of resources, which may be defined based at least in part on characteristics of resources. For instance, in some embodiments, virtual computer systems are able to be associated with user generated tags that may be descriptive of a role fulfilled by the virtual computer systems. As an example, a group of virtual computer systems may be associated with a tag "web server." Resources, accordingly, may be identified by such tags. As another example, a resource may correspond to a logical data container thereby causing the statement 700 to be applicable any data objects stored within the logical data container, i.e., associated with the logical data container. Resources (e.g., data objects) may also be defined by keys used to encrypt the resources. In addition to the foregoing, objects to which policy applies (e.g., principals and resources) may be based at least in part on attributes which may be communicated using Security Assertion Markup Language (SAML) and/or attributes that are determined using a directory.

As illustrated in FIG. 7, a statement 700 may also include one or more conditions. The conditions, in an embodiment, are determinative of whether the statement in the policy document applies in a particular context, i.e., applies to a submitted request in the context in which it was submitted. The conditions may utilize Boolean operators (equal, less than, etc.) to allow evaluation of the conditions over other values in the statement (principal, resource, etc.) and other values in an authorization context, which may or may not be provided in a request for which policy is being evaluated. Condition values can include date, time, the Internet Protocol (IP) address of the requester, an identifier of the request source, a user name, a user identifier, and/or a user agent of the requester and/or other values. Values may also be unique to a service to which the condition applies. Conditions may be logically connected for evaluation using logical connectors such as AND and OR.

Statements may also encode one or more actions 708. An encoded action may represent operations that occur when the condition(s) 706 are fulfilled and/or unfulfilled. Example actions include allowing a request to be fulfilled (e.g., allowing requested access) or denying a request. Other actions include transmission of notification in accordance with information encoded in the statement 700, such as transmission of an electronic mail message to one or more electronic mail addresses specified in the statement 700, publishing a notification to a topic of a notification service and/or other actions. Accordingly, an encoded action 708 may include information sufficient for performing the action. In some embodiments, statements may lack actions when, for example, default actions are applicable. For instance a policy management system may operate so that actions are allowed (or denied) policy cause the actions to be denied (or allowed). Defaults may be system wide or may vary (e.g., with customers selecting defaults).

Figure 8:
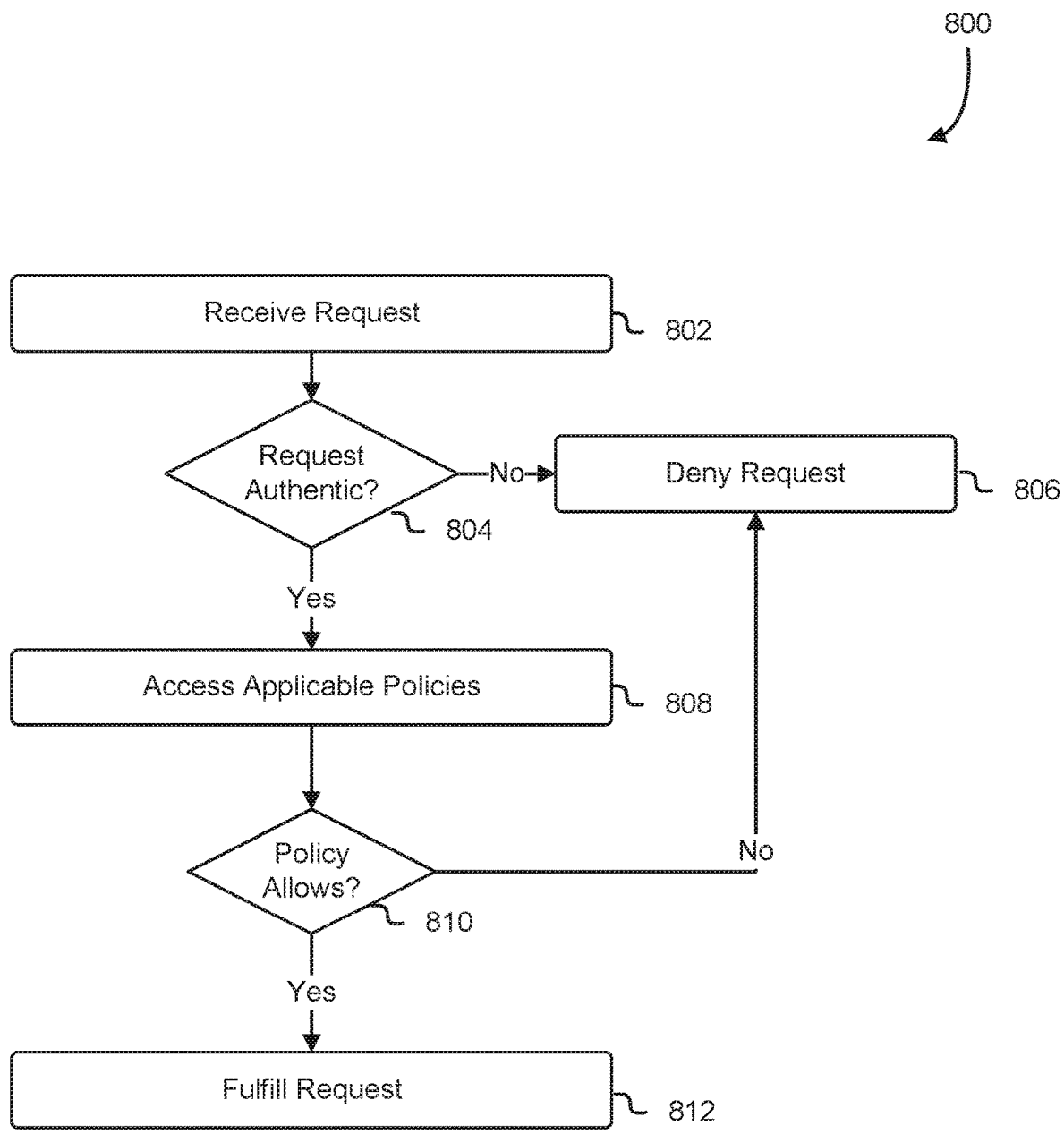
FIG. 8 shows an illustrative example of a process for processing a request in accordance with at least one embodiment.

FIG. 8 shows an illustrative example of a process for processing requests in accordance with an embodiment. The process 800 may be performed by any suitable system or component thereof such as a service described above and/or the service 400 described above. In an embodiment, the process 800 includes receiving 802 a request. The request may be received, for example, as an appropriately configured API call to a frontend system (e.g., comprising a web server) of a system performing the process 800. The API call may be, for instance, in the form of a web service call configured with various parameters applicable to the request. Upon receipt 802 of the request, the process 800 may include determining 804 whether the request is authentic. Determining 804 whether the request is authentic may be performed in any suitable manner. For example, in some embodiments, the request may be signed and, therefore have an associated electronic signature. Accordingly, determining 804 whether the request is authentic may include verifying the electronic signature. Verification of the electronic signature may be done by any suitable system or component thereof. For instance, referring to embodiments described above, an authentication runtime service or authentication service may perform the verification. It should be noted that the verification may be performed by other entities. For instance, in some embodiments, verification is not done in a distributed manner but done by a frontend system such as described above. Generally, any manner in which the authenticity of the request may be determined may be used.

If it is determined 804 that the request is not authentic, the request may be denied 806. Denying the request may be performed in any suitable manner, such as by responding to the request with information indicating the denial by simply taking no action and/or by providing information that indicates one or more reasons why the request is denied and/or additional information which may be necessary to enable addressing the reason for denial. If, however, it is determined 804 that the request is authentic, the process 800 may include accessing 808 one or more applicable policies. Accessing 808 applicable policies may be performed by any suitable system or component thereof, such as by a policy management service described above. Applicable policies may be accessed, for example, by retrieving policy documents from a policy repository such as described above. In some embodiments, timing information indicating when policies become effective is used to select a subset of policies from a set of policies that are applicable (e.g., a set of policies that, without regards to the timing information, would apply to the request). The selected subset may comprise those policies that have timing information indicative of the policies in the subset currently being in effect.

A determination may then be made 810 whether applicable policies allow fulfillment of the request. A determination 810 whether policy allows fulfillment of the request may be performed by any suitable system such as by a policy engine described above. A policy engine or other system determining whether policy allows fulfillment of the request may analyze applicable policies to determine whether the policy allows fulfillment of the request. As discussed, the manner in which the analysis takes place may vary in accordance with various embodiments. For example, applicable policies or, generally, potentially applicable policies may be analyzed in sequence. If a policy in a sequence of policy would be violated by fulfillment of a request, a determination may be made that policy does not allow fulfillment of the request without analyzing the remainder of the sequence (if any). More complex processing may also be performed. For example, if a statement in a policy document indicates that fulfillment of the request would violate policy encoded in the statement, a determination may be made whether any additional policies supersede that policy and allow fulfillment of the request. Generally, the policies may be analyzed in any suitable manner, and the manners may vary in accordance with which the various systems are configured and how policies are encoded. If it is determined 810 that policy does not allow the request to be fulfilled, the process 800 may include denying 806 the request such as described above. If, however, it is determined 810 that policy does allow fulfillment of the request, the request may be fulfilled 812.

As with all processes discussed herein, variations are considered as being within the scope of the present disclosure. For example, the process 800 and other processes described herein may include additional operations in addition to those illustrated and/or discussed herein. For example, in some instances, a system, such as a policy enforcement system may maintain (or have maintained by another system) an audit log of requests. An audit log may be made on a system-wide basis, on a customer-specific basis so that each customer of a service provider has a corresponding audit log or otherwise. The audit log may record requests that were received by a system (e.g., computing resource service) and store information associated with the requests, such as whether the requests were fulfilled, denied, unsuccessfully fulfilled and the like. Other information associated with a request stored in an audit log may include information identifying a submitter of the request (requestor), computing resources affected by the request, information about when the request was received and the like. In some embodiments, when requests are received, information is written to an audit log that identifies one or more services that caused the request to be submitted (e.g., a via set, as discussed in more detail below). For example, if the request was submitted by a first service as a result of having received a request from a second service, information may be written to the audit log that identifies the first and second service. Such information may indicate an order of causation of events that caused the request and/or may include other information.

Figure 9:
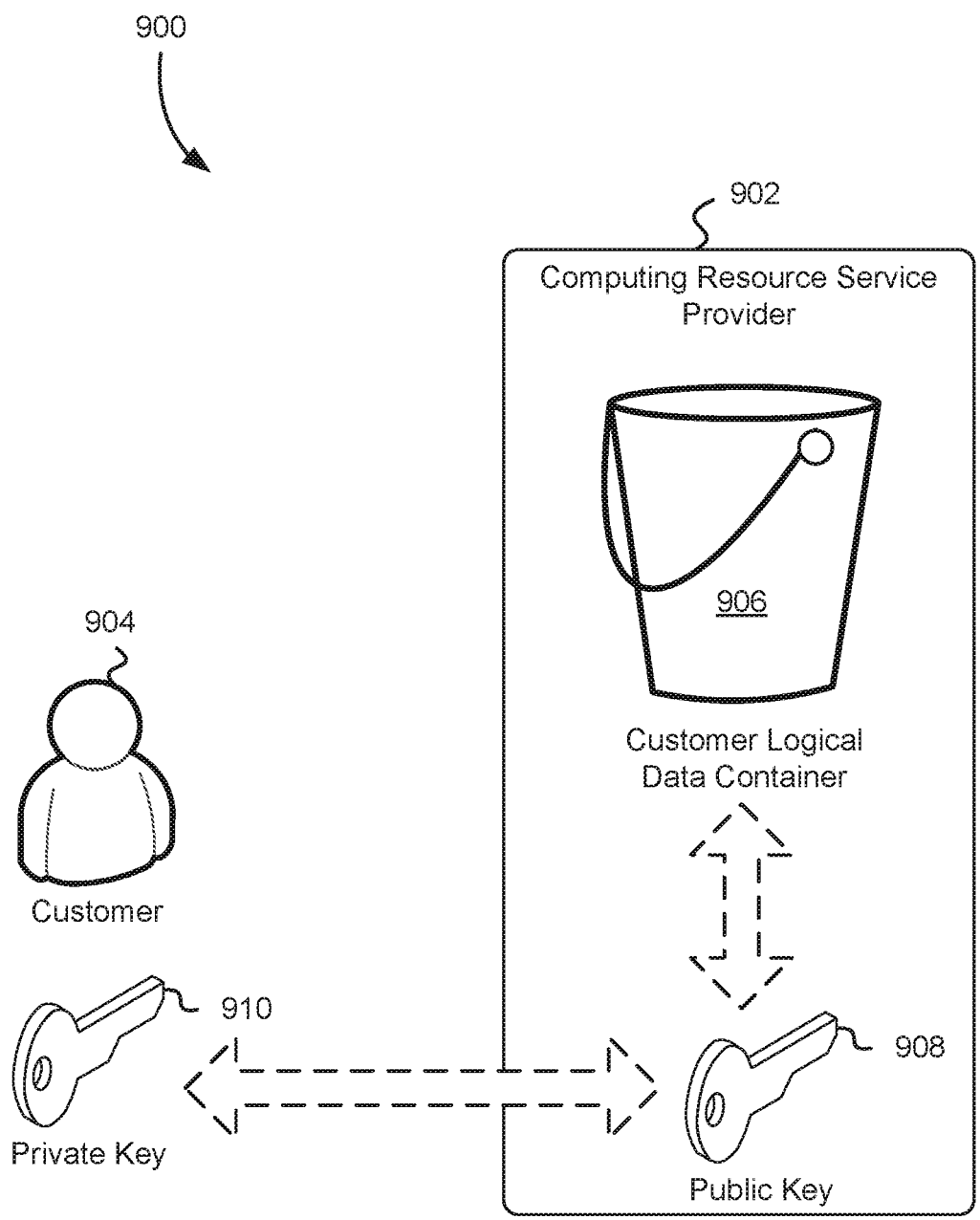
FIG. 9 shows an illustrative diagram illustrating various aspects of the present disclosure.

FIG. 9 shows an illustrative example of an environment 900 in which various embodiments may be practiced. As illustrated in FIG. 9, the environment 900 includes a computing resource service provider 902 which may be a computing resource service provider such as described above, although the scope of the present disclosure is not limited to such service providers, but includes numerous service providers that process data as part of their services. Also illustrated in FIG. 9 the environment 900 includes a customer 904 of the computing resource service provider 902, The customer 904 of the computing resource service provider 902 may utilize various computing resource services of the service provider 902. For example, as illustrated in FIG. 9, data storage services of the computing resource service provider 902 are utilized by the customer 904 to maintain a customer logical data container 906, which may be a data container in which data objects of the customer 904 are stored by the computing resource service provider 902 utilizing infrastructure thereof. As illustrated in FIG. 9, the customer logical data container 906 is associated with a public key 908 of a public/private key pair where the private key 910 of the public/private key pair is maintained by the customer 904 or otherwise outside the control of the computing resource service provider 902. In this manner when the customer 904 uploads data objects to the computing resource service provider 902, such as by using a data storage service such as described above, the computing resource service provider may encrypt the data object using the public key 908.

In some embodiments, for example, a device (e.g., web server) of the computing resource service provider 902 generates a symmetric cryptographic key (e.g., a cryptographic key usable in an advanced encryption standard (AES) algorithm) and uses the generated symmetric cryptographic key to encrypt a data object uploaded by the customer 904 and uses the public key 908 to encrypt the generated symmetric cryptographic key which, in encrypted form, is stored with or otherwise in association with the encrypted data object in the customer logical data container 906. It should be noted that other variations are also considered as being within the scope of the present disclosure. For example, the public key 908 itself may be used in a cipher used to encrypt the data object instead of utilizing a symmetric cryptographic key to encrypt the object.

The public key 908 may be associated with the customer logical data container 906 in various ways in accordance with various embodiments. For example, in some embodiments the customer 904 utilizes an interface provided by the computing resource service provider 902 to set a policy on the customer logical data container 906 that, when active, causes data objects received by the computing resource service provider 902 for storage in the customer logical data container 906 to be encrypted using the public key 908. It should be noted however that the association need not be made by a policy but may be otherwise maintained by a system of the computing resource service provider 902, For example, a database may maintain an association between the customer logical data container 906 and the public key 908 without an association being made by a policy document maintained by a policy management system such as described above.

Figure 10:
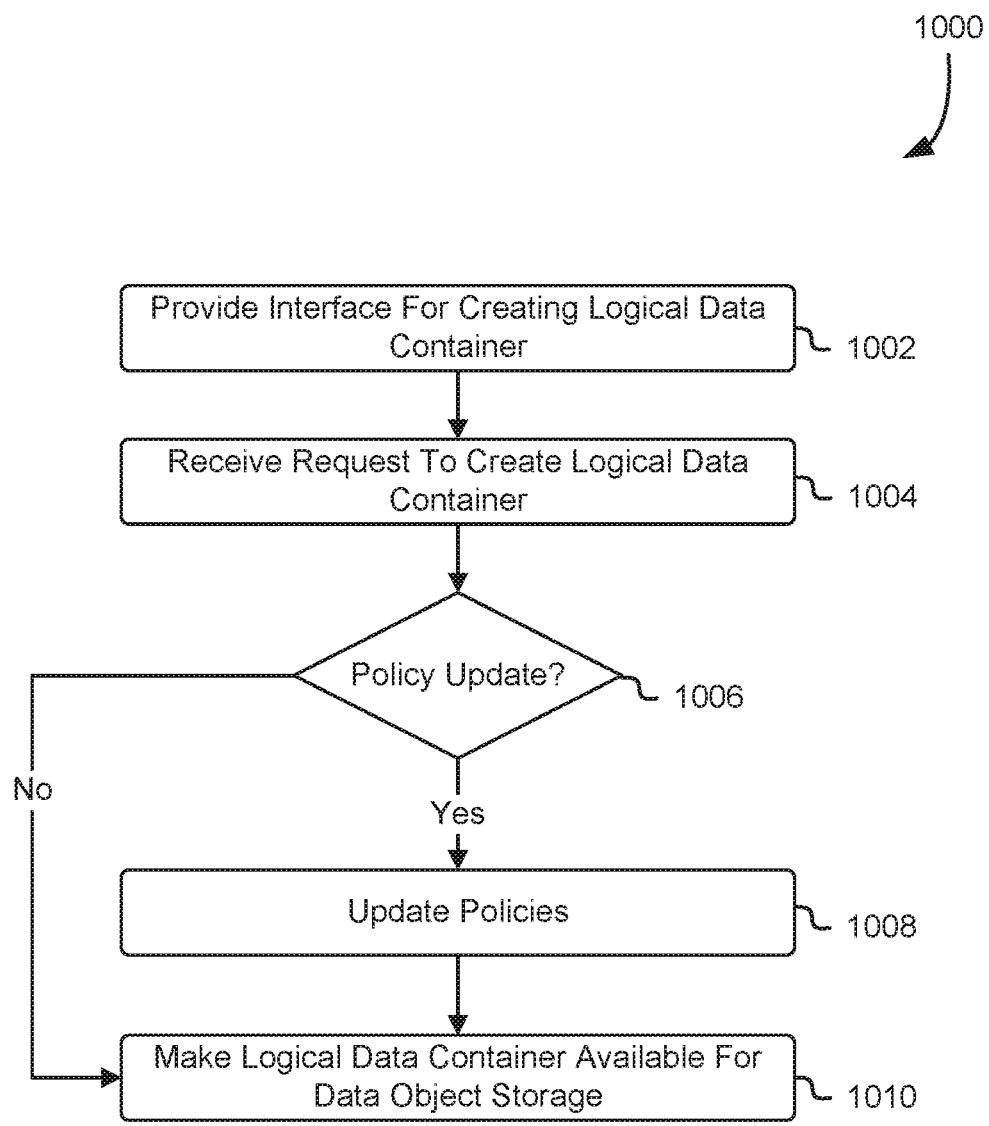
FIG. 10 shows an illustrative example of a process for creating a logical data container in accordance with at least one embodiment.

FIG. 10 shows an illustrative example of a process 1000 which may be used to enable customers of a computing resource service provider to create logical data containers in accordance with various embodiments. The process 1000 may be performed by any suitable system such as by a system providing a web interface to the computing resource service provider services. Such a system may include for example various web and application servers, such as described above and below, in order to enable the operations of the process 1000 to be performed. In an embodiment, the process 1000 includes providing 1002 an interface for creating a logical data container. The interface may be provided 1002 in various ways in accordance with various embodiments. In some embodiments for example the interface is a graphical user interface provided over a network. The interface may be for example in the form of a web page or series of web pages. The interface may be provided in other ways such as through a mobile or other application or through a general web service interface which may be interacted with in various ways, such as by way of a command line interface. Generally any interface by which requests may be received over a network may be used. Providing 1002 the interface may be performed in various ways in accordance with various embodiments and in accordance with the type of interface that is provided. In some examples for example the interface is provided 1002 by transmitting data for a web page (e.g., one or more HTML and/or other structured documents) over a network to a user, that is, to a device of a user. Providing 1002 the interface may be also performed in other ways such as by providing a system to which network requests may be submitted, for example by providing one or more web servers operable to receive requests from users over a network.

In an embodiment the process 1000 includes receiving 1004 a request to create a logical data container. The request may be received in various ways in accordance with various embodiments. For example, the request may be a web service request received by a web server of a computing resource service provider system that performs the process 1000. The request may also be received from an internal system within a computing environment of the computing resource service provider. For example as noted before, the interface may be provided as a graphical user interface in the form of a web page transmitted to a user over a network. Interactions with the web page may be transmitted over a network to a web server that provides the interface and, as a result of user input to the web page being indicated in the transmission from the user, a server used in connection with providing the interface may transmit the request to another server of the computing resource service provider operable to process the request or otherwise cause the request to be processed.

Having received 1004 the request to create the logical data container, a determination may be made 1006 whether a policy update is to be made. For example, as discussed above and also in more detail below, creation of a logical data container may also include definition of one or more policies that affect the logical data container, such one or more policies applicable to writing objects to the logical data container and/or reading objects from the logical data container. Accordingly, if such a policy definition has been made as part of creation of the logical data container where such information may be indicated in the request or otherwise in connection with the request, a determination may be made that policy requires update.

Upon updating 1008 policies of a customer for which the request was received or upon a determination that policy does not require updating, the process 1000 may include making 1010 a logical data container available for data object storage. The logical data container may be made available in accordance with parameters in the request. For example, the logical data container may be given a name specified in the request. One or more systems in a region and/or subregion specified in the request may be updated to enable the storage of data objects in the logical data container. Other operations may also be performed in order to make the logical data container available for data object storage.

It should be noted that while FIG. 10 (and FIG. 11 below) shows a policy update being made in or otherwise in connection with a request to create a logical data container, policies may be associated with logical data containers in other ways. For instance, in some embodiments, a policy may be created and applied to a logical data container that was already in existence at the time of definition and/or activation of the policy. Further, policies may become associated with logical data containers through other changes made in connection with corresponding accounts of a computing resource service provider.

Figure 11:
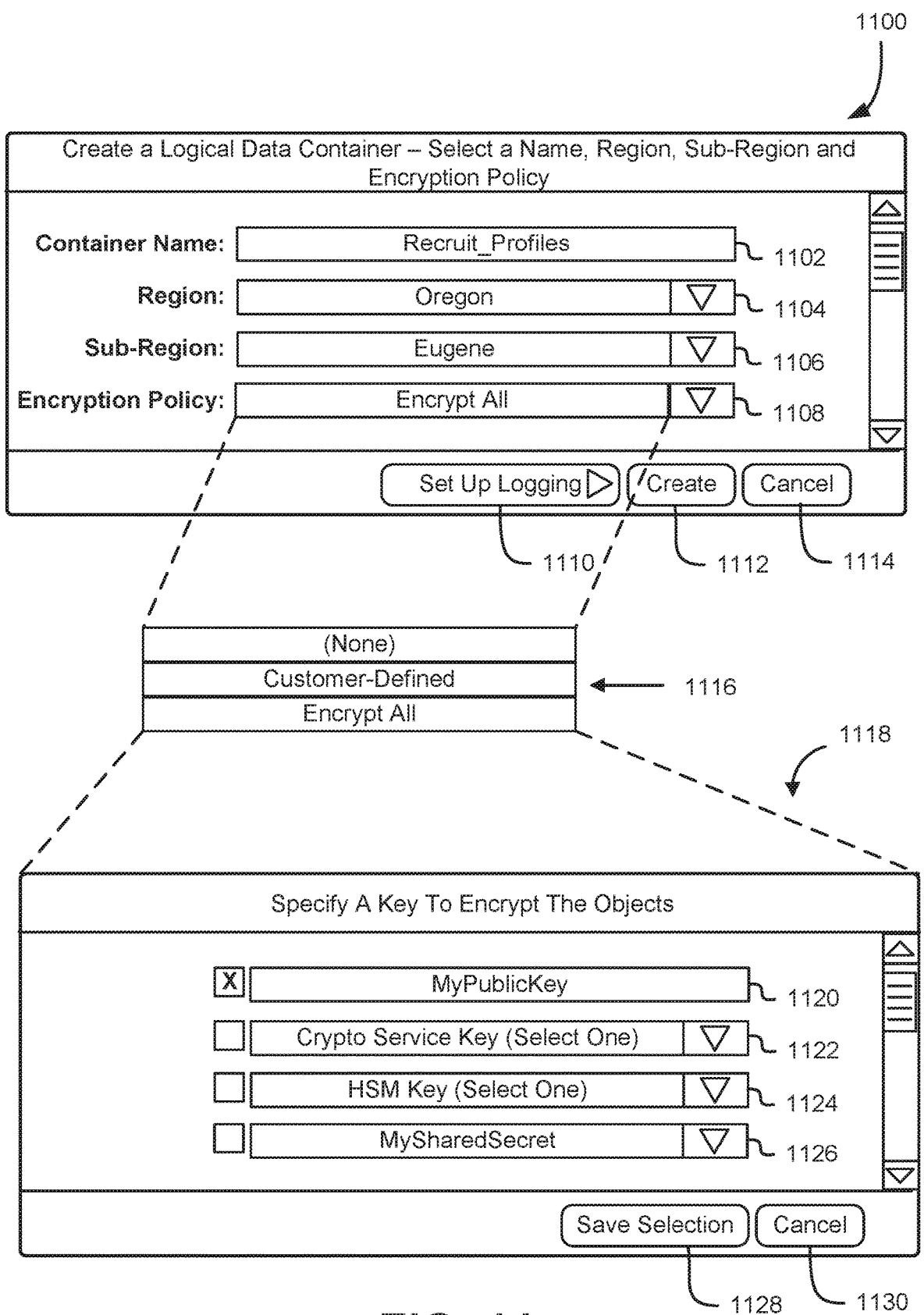
FIG. 11 shows an illustrative example of a graphical user interface usable to cause submission of a request to create a logical data container in accordance with at least one embodiment.

As discussed, graphical user interfaces may be provided to enable customers of a computing resource service provider to benefit from various techniques described herein and variations thereof. FIG. 11, accordingly, shows an illustrative example of an interface 1100 which may be provided to a customer of a computing resource service provider in accordance with various embodiments. The interface 1100 as illustrated in FIG. 11 may be a graphical user interface provided in various ways, such as in a web page accessed by a user of the customer. As illustrated in FIG. 11, the interface 1100 includes various interface components applicable to creation of a logical data container. The user interface components are various user interface elements that enable the definition of parameters for a logical data container. For example, as illustrated in FIG. 11, the interface 1100 includes a container name field 1102 which in an embodiment allows the entry of characters defining a name for a logical data container. The interface 1100 also includes a region component 1104 which, in this illustrative example, is in the form of a drop-down menu selectable by a user to select a region from a plurality of regions in which the computing resource service provider has facilities and corresponding computing infrastructure. In this example, the interface 1100 includes a subregion component 1106 which, as with the region component 1104, is in the form of a drop-down menu to enable selection of a plurality of subregions corresponding to a region selected using the region component 1104.

An encryption policy component 1108 enables user selection of an encryption policy for objects to be stored in the data container to be created using the interface 1100. As with other components of the interface 1100, the encryption policy component 1108 is in the form of a drop-down menu enabling selection of a plurality of encryption policies provided by the computing resource service provider. As illustrated in FIG. 11, the interface 1100 also includes various user interface buttons enabling corresponding operations to be performed upon selection of a button. For example, selection of a set of logging buttons 1110 may cause another interface to appear to enable selection and/or other definition of parameters for logging of activity in connection with the logical data container to be created using the interface 1100. For example, reads from and/or writes to a logical data container to be created by the interface 1100 may be logged in accordance with the parameters set for the logging. One or more records may be written to an audit log as a result of the policy being invoked (e.g., a request being submitted where the policy applies to the request and, as a result, requires one or more data transformations to occur.) A create button 1112 allows for a request to be submitted to the computing resource service provider to create a logical data container in accordance with the parameters defined using the interface 1100. A cancel button 1114 may enable the process of creation of a logical data container using the interface 1100 to be cancelled, which may cause the interface 1100 to disappear from a display on which the interface 1100 is presented.

As noted above, an encryption policy component 1108 may provide selection from a predefined set of possible encryption policies to be selected. Accordingly, FIG. 11 shows a menu 1116 of possible choices in accordance with various embodiments. In accordance with the illustrative menu shown in FIG. 11, a user of the interface 1100 may select none, meaning that no encryption policy will be set for the logical data container to be created using the interface 1100. A customer-defined option is also shown, the selection of which may cause another interface which may enable the user to define a customized policy that determines when objects stored in the logical data container to be created should be encrypted. As discussed above, a customer-defined policy may define conditions that, when satisfied, cause a data object to be encrypted when stored in the logical data container. For example, the conditions may be based at least in part on principles, resources and/or other factors, including those described in more detail below. Also as illustrated in FIG. 11, the menu 1116 allows for selection of an encrypt all policy, the selection of which causes a policy to become active, where the active policy causes all data objects stored to the logical data container to be encrypted.

As noted above, a cryptographic key may be associated with the logical data container to be created using the interface 1100. In various embodiments, the interface 1100 allows for the selection of a key from various keys. Accordingly, a subinterface 1118 may appear upon selection of an encryption policy for which selection of a key may be applicable, such as encrypt all or a customer-defined policy. In an embodiment, the subinterface 1118 includes selections from a plurality of keys selectable by the user, which may be keys maintained specifically for the user by the computing resource service provider. In the example of FIG. 11, the subinterface 1118 includes a plurality of options selectable using corresponding check boxes which may be configured such that only a single check box is selectable, although in some embodiments multiple check boxes may be selectable, thereby causing encryption using multiple keys, such as using encryption by one key and then encryption of the result using another key. The options in the subinterface 1118 may be populated based at least in part on information of a customer to whom the subinterface 1118 is provided. For example, a customer may register a public key with the computing resource service provider and, as such, the registration may provide data for populating the subinterface 1118. Further, a system providing the interface 1100 may transmit API calls to other systems to obtain an inventory of keys (indexed by key identifiers) of the customer. Generally, any way by which information for populating the subinterface 1118 is obtainable may be used.

In an embodiment, a public key component 1120 allows for selection of a public key of the customer which, as described above, may be a public key of a public/private key pair where the private key of the public/private key pair is maintained inaccessible to the computing resource service provider. Thus, upon receipt of the data and encryption thereof, the computing resource service provider, once it has discarded the unencrypted data, is unable to access the data in plaintext form without having gained access to the private key. A cryptography service component 1122 may allow selection from one or more keys maintained in a cryptography service of the computing resource service provider. The cryptography service component 1122, in this example, is in the form of a drop-down box which may be usable to select a key from a plurality of keys. The options selectable using the cryptography service component 1122 may be shown by identifiers of the corresponding keys. In some embodiments, a computing resource service provider or another entity, such as the customer, may maintain a hardware security module (IBM) which securely stores cryptographic keys and uses the securely stored cryptographic keys to perform cryptographic operations. Accordingly, the subinterface 1118 may include an option for selection of a key stored in an HSM.

As with the cryptography service component 1122, the HSM key component 1124 is illustrated in the form of a drop-down menu which allows for selection of a key from a plurality of keys available to the customer for use. The keys may be selected using corresponding identifiers displayed upon selection of the drop-down menu. In some embodiments, a customer may share a symmetric cryptographic key with the computing resource service provider. For example, the customer or computing resource service provider may generate the symmetric cryptographic key and transfer the generated cryptographic key to the other entity using a secure key transfer protocol. Accordingly, a shared secret component 1126 allows for selection from one or more shared secrets. As illustrated in FIG. 11, the shared secret component 1126 is in the form of a drop-down menu which allows for selection from one or more options.

The subinterface 1118 may include interface buttons, which allow for causing various functions to happen, such as a button 1128 for saving a selection made using the subinterface 1118, and a button 1130 for cancelling a selection in progress. It should be noted that the interface 1100 is illustrative in nature and that interfaces may vary widely in accordance with various embodiments and, as discussed above, interfaces need not be graphical user interfaces.

Once parameters have been set by the user using the interface 1100 (e.g., by selecting the create button 1112), a device of the customer may submit the parameters to a webserver of the computing resource service provider which may then submit, on behalf of the customer, a request to an interface of the computing resource service provider to create a logical data container in accordance with the parameters. Alternatively, the interface 1100 may be configured such that the customer device transmits API call itself. Generally, any way by which a request to create the logical data container is submitted may be used.

While FIG. 11 shows an illustrative example of association of a policy with a logical data container being caused by a request to create the logical data container, other ways by which policies may be associated with logical data containers are also considered as being within the scope of the present disclosure. For example, a policy may be received for a logical data container through a bearer token, by an association with a principal causing the request to create the logical data container to be created, by way of an account-wide policy, by way of the logical data container being tagged (e.g., by a tagging service of the computing resource service provider) with a particular value and a policy applying to resources tagged with the particular value, and in other ways.

Figure 12:
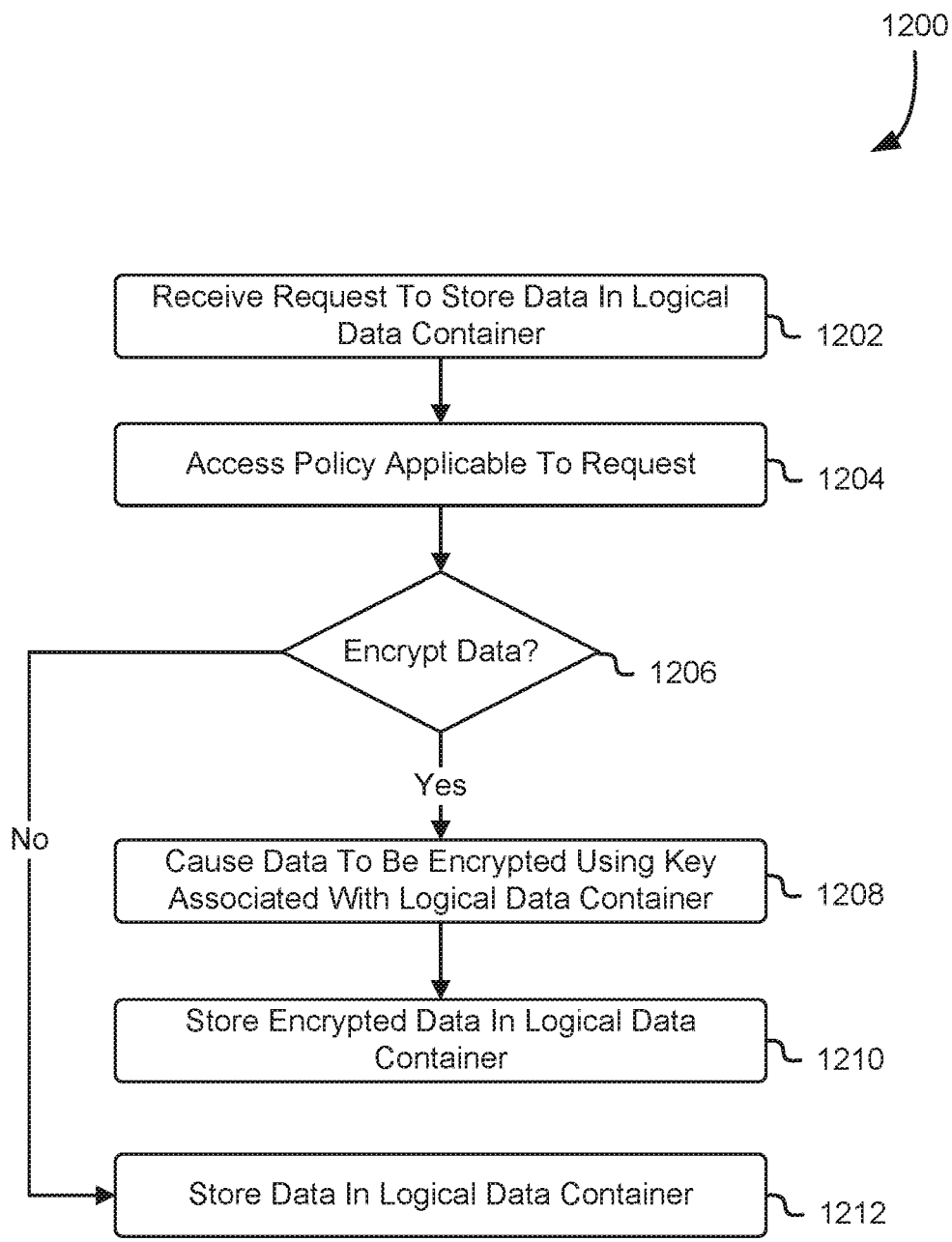
FIG. 12 shows an illustrative example of a process for processing a request to store data in accordance with at least one embodiment.

Once the logical data container has been created, data objects may be stored in the logical data container. FIG. 12, accordingly, shows an illustrative example of a process 1200 for processing a request to store data in a logical data container in accordance with various embodiments. The process 1200 may be performed by any suitable system such as by a web server of a data storage service or collectively by a plurality of servers of a data storage service that are collectively configured to perform the process 1200. In an embodiment, the process 1200 includes receiving 1202 a request to store data in a logical data container. The request may be received 1202 in any suitable manner, such as in the form of an appropriately-configured API call to a data storage service performing the process 1200, where an appropriately-configured API call may be an API call formatted so as to be successfully fulfillable by the system processing the request. As discussed above, in various examples, the request is in the form of an appropriately-formatted web service request to the system performing the process 1200.

In an embodiment, the process 1200 includes accessing policy applicable to the request. For example, a store of policies may be accessed to determine any policies applicable to the request. The policies accessed 1204 may be analyzed to determine whether to fulfill the request and also to determine 1206 whether to encrypt the data for storage in the logical data container. If determined to encrypt the data, the process 1200 may include causing 1208 the data to be encrypted using a key associated with the logical data container. For example, a system performing the process 1200 may perform the encryption itself. Performance of the encryption may include communication with another system having access to the key needed, although the system performing the process 1200 may maintain a copy of the key in its own memory. Causing 1208 the data to be encrypted may also include transmitting the data to another system, such as an HSM of the customer, an HSM not exclusive to the customer, or to a cryptography service, to cause the other system to perform the encryption.

Other variations are also considered as being within the scope of the present disclosure. For example, in some embodiments the system performing the process 1200 may generate a symmetric key used to encrypt the data. The generated symmetric key may be encrypted using the key associated with the logical data container. Accordingly, if another system has access to that key, the key may be obtained from that system or the generated key may be transmitted to that system for encryption thereby. The system that encrypts the key may provide the encrypted key in return to be stored with the data in the logical data container. Generally any way by which the data may be caused to be encrypted using the key associated with the logical data container is considered as being within the scope of the present disclosure.

Once the data has been encrypted, the process 1200 may include storing 1210 the encrypted data in the logical data container, which may be performed, for example, by storing the encrypted data in association with an identifier of the logical data container or, if applicable, placing the data object in a queue, database, or other data storage mechanism. Further, storing the encrypted data may be performed in various ways in accordance with various embodiments. For example, a data storage system may redundantly store the data and may use various schemes for doing so. In some examples, copies of the data are stored in different data storage devices. In other examples, an erasure coding scheme is used to store shards of the data among various data storage devices so that only a proper subset of the shards is required for construction of the data object. Other ways by which the data may be stored may also be used. Returning to the illustrative embodiment illustrated in FIG. 12, if it is determined 1206 not to encrypt the data, the data may be stored 1212. In the logical data container such as described above. As with encrypted data, the data may be redundantly stored among a plurality of data storage devices using an erasure coding scheme or otherwise.

While FIG. 12 shows a particular workflow for storing data in a logical data container where, for some data, data is transformed before storage in a logical data container, other workflows are considered as being within the scope of the present disclosure. In some embodiments, for example, data may be transformed after storage in a logical data container where an asynchronous process transforms the data at a later time. In some embodiments, a requirement may be enforced where the data may be temporarily stored in the logical data container, but the data must be transformed prior to retrieval from the logical data container. If the asynchronous process does not result in the data being transformed prior to a request to retrieve the data, the data may be transformed before provided in response to a request to retrieve the data. Other variations are also considered as being within the scope of the present disclosure.

Figure 13:
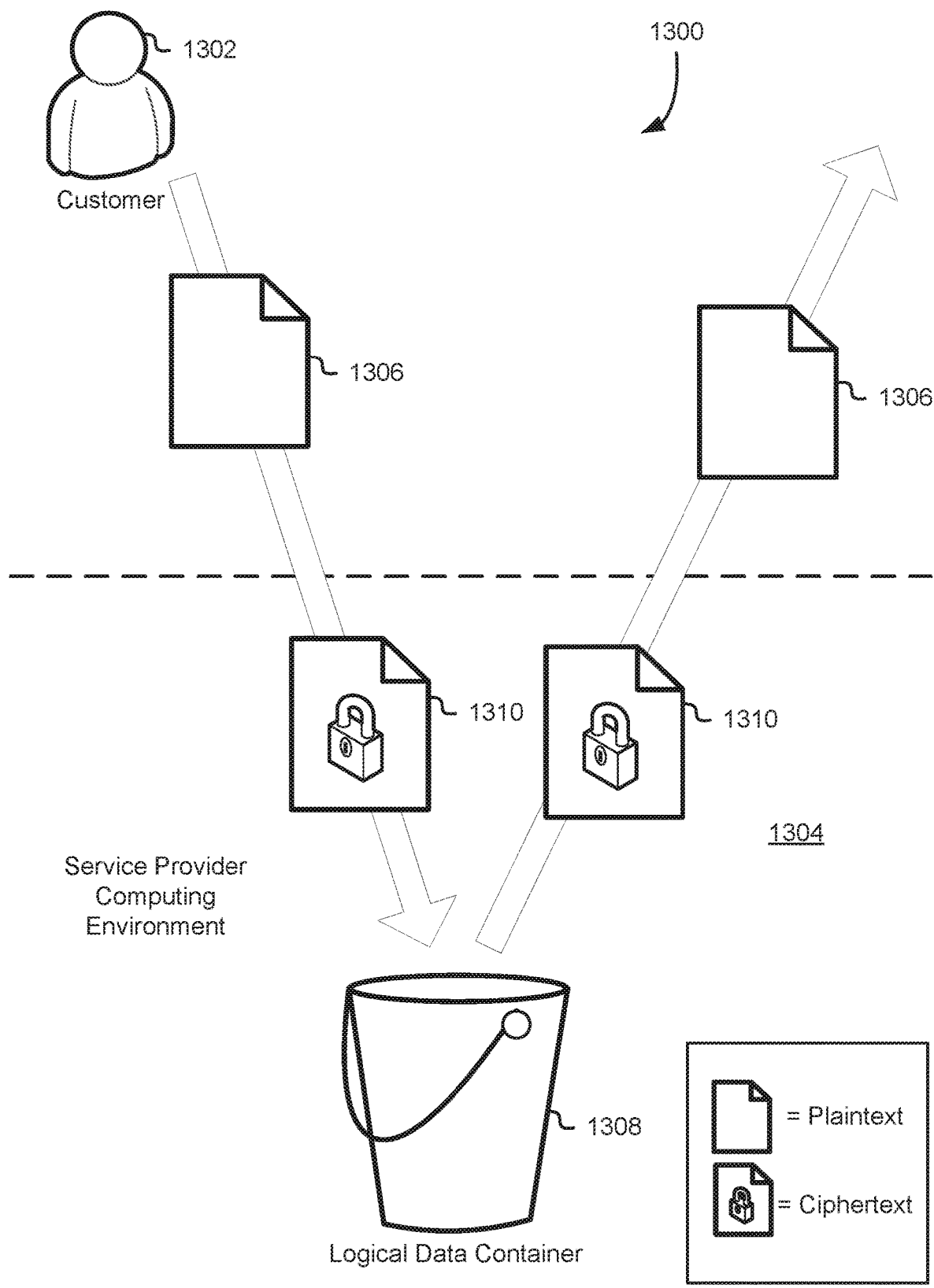
FIG. 13 shows an illustrative diagram illustrating various aspects of the present disclosure.
Figure 14:
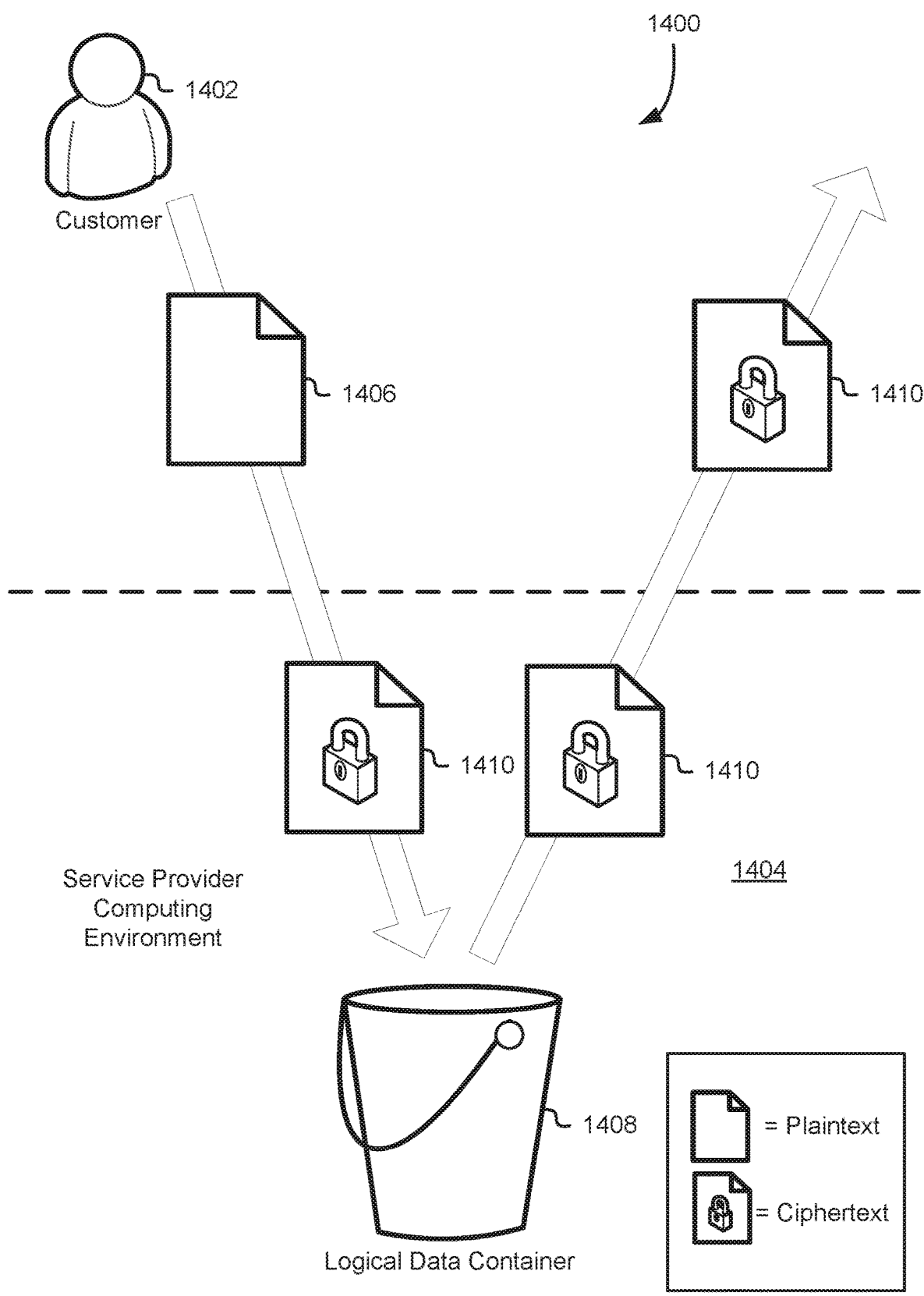
FIG. 14 shows an illustrative diagram illustrating various aspects of the present disclosure.
Figure 15:
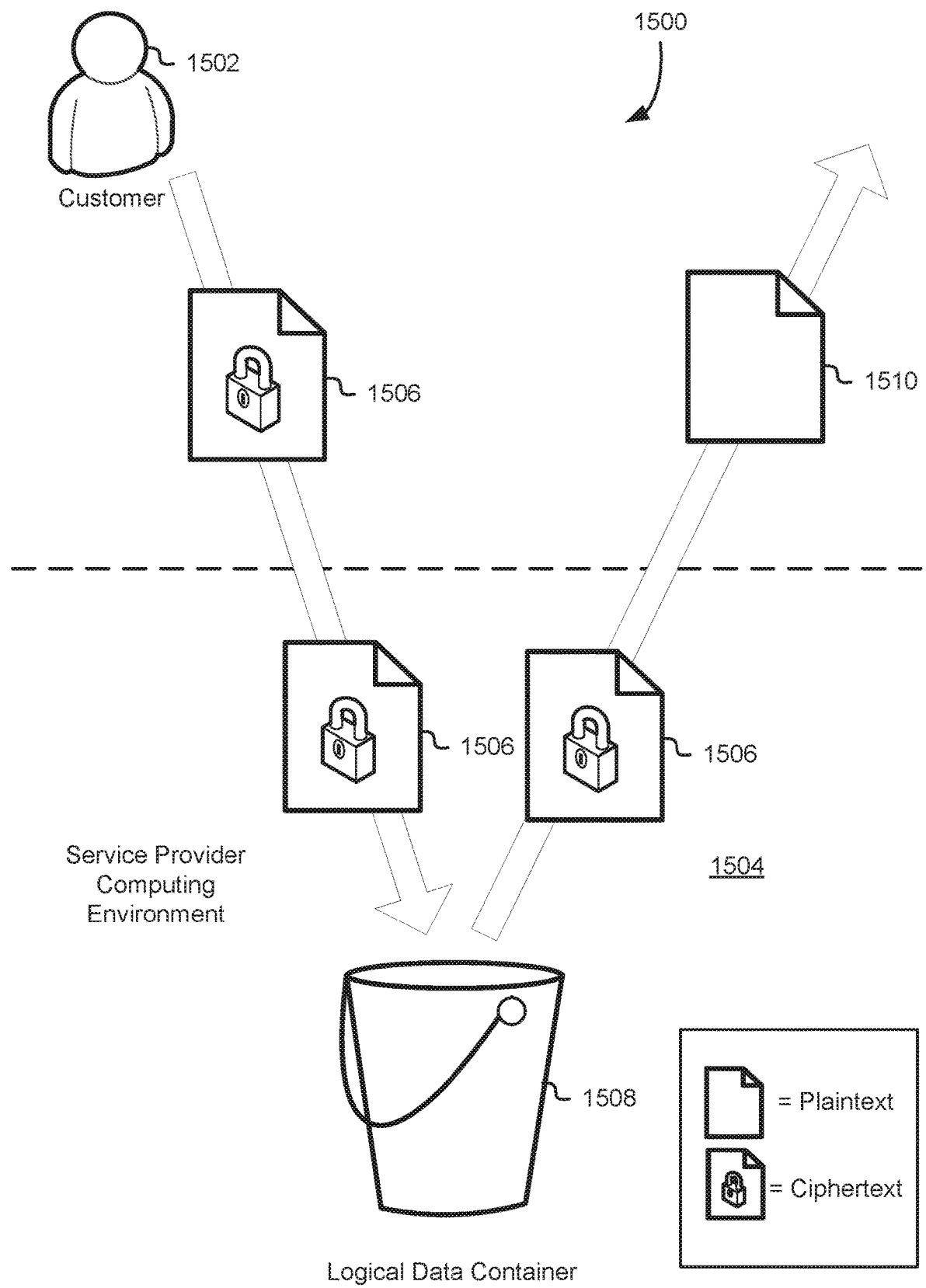
FIG. 15 shows an illustrative diagram illustrating various aspects of the present disclosure.

While many of the above examples illustrate processes by which customers of a computing resource service provider applied data in plaintext form to the computing resource service provider which is then encrypted by the computing resource service provider, numerous variations are considered as being within the scope of the present disclosure. FIGS. 13-15 illustrate some such examples considered as being within the scope of the present disclosure. FIG. 13, for example, shows an illustrative example of an environment 1300 in which various embodiments may be practiced. In this example, the environment 1300 includes a customer 1302 and a service provider computing environment 1304. As illustrated in FIG. 13, the customer 1302, through a computing device, may transfer data 1306 to the service provider computing environment 1304 such as by way of an API call to store the data in a logical data container 1308. As illustrated in FIG. 13, at some point upon reaching the service provider computing environment a server of the service provider computing environment may encrypt the data 1306 thereby creating encrypted data 1310. The encrypted data 1310 may be stored by the service provider in the computing environment in the logical data container 1308. When the service provider computing environment (e.g., a server in the service provider computing environment) receives a request to access the data (e.g., by an API call referencing the data by an identifier, which may be a URI), the service provider computing environment may access the encrypted data 1310 and decrypt the encrypted data 1310, thereby obtaining the data 1306. The request may be from the customer or another entity authorized to access the data 1306. The data 1306 may then be provided in response to the request.

The example of FIG. 13 may be achieved in circumstances where the service provider computing environment 1304 has access to a cryptographic key usable to decrypt the encrypted data 1310 or otherwise can cause the encrypted data 1310 to be decrypted. For example, the service provider computing environment may share secretly a symmetric cryptographic key with the customer. As another example, the request to access the data may include a key usable to decrypt the data. Generally, any way by which the service provider computing environment can obtain the data 1306 from the encrypted data 1310 is considered as being within the scope of the present disclosure.

FIG. 14 shows an illustrative example of an environment 1400 in which various embodiments may be practiced. The environment 1400 may be the same as the environment 1300 discussed above in connection with FIG. 13. For example, as illustrated in FIG. 14, the environment 1400 includes a customer 1402 and a service provider computing environment 1404. As with FIG. 13, the customer 1402 transmits data 1406 to the service provider computing environment. The customer 1402 may, for example, submit a request to store the data 1406 in a logical data container 1408. A server or other device of the service provider computing environment may encrypt the data 1406 thereby creating encrypted data 1410. The encrypted data 1410 may be stored in the service provider computing environment in the logical data container 1408. Unlike in FIG. 13, however, when a request to access the data is received by the service provider computing environment 1404, the encrypted data 1410 is retrieved and provided in encrypted form. Such may occur, for example, when the service provider encrypts the data 1406 using a public key of a public/private key pair for which the service provider computing environment 1404 lacks access to the private key. An entity receiving the encrypted data 1410 which may be the customer 1402 or another entity may receive the encrypted data and, if that entity has access to the private key or otherwise access to a cryptographic key usable to decrypt the data, may decrypt the data.

FIG. 15 shows an illustrative example of an environment 1500 in which various embodiments may be practiced. As with the environments 1300 and 1400 discussed above in connection with FIGS. 13 and 14 respectively, the environment 1500 includes a customer 1502 of a service provider that communicates with a service provider computing environment 1504. For example, the customer 1502 may transmit data 1506 to the service provider computing environment 1504 such as in the form of an API call to the service provider computing environment. The request to store the data 1506 may be, for example, a request to store the data in a logical data container 1508. Unlike FIGS. 13 and 14, however, as illustrated in FIG. 15 the customer 1502 transmits encrypted data 1506 to the service provider. The service provider receives the encrypted data and stores the encrypted data in the logical data container 1508. It should be noted that while FIG. 15 shows the encrypted data 1506 being stored in the logical data container, additional encryption may be applied by the service provider. For example, for storage the service provider may encrypt the encrypted data 1506 and decrypt the encrypted data to access when appropriate.

When a request to access the encrypted data 1506 is received by the service provider computing environment, the encrypted data 1506 may be accessed from data storage and a server or other device of the service provider computing environment 1504 may decrypt the encrypted data 1506 and provide decrypted data 1510. The flow of data illustrated in FIG. 15 may be enabled in various ways in accordance with various embodiments. For example, the customer 1502 may encrypt the data using a public key of a public/private key pair to which the service provider has access to the private key of the public/private key pair. As another example, the customer 1502 and the service provider computing environment may share a secret symmetric key. A customer 1502 may use the symmetric key to generate the encrypted data 1506 and the service provider computing environment may utilize a copy of the symmetric key to fulfill a request to access the data. As yet another example, the service provider computing environment may communicate with another service or device having access to a key usable to decrypt the encrypted data 1506 such as an HSM or a cryptography service. Generally any way by which the service provider computing environment can obtain and provide decrypted data 1510 is considered as being within the scope of the present disclosure.

As discussed above, the various embodiments of the present disclosure are illustrated using encryption. However, other data transformations are considered as being within the scope of the present disclosure. For example, other data transformations that may be used instead of or in addition to encryption or decryption and other reversible transformations include generation of a copy of data and transmission to another data storage system, generating a hash of the data (an example of an irreversible transformation) or a portion thereof, such as a field of the data if the data is in a structured format, encryption of a portion of the data such as a field of the data if the data is in a structured format, translation of textual data to a foreign language, redaction, such as by replacing data with other data lacking semantic meaning, such as a series of stars or Xs or random data, deletion of data, generation of a log, substitution of data with other data, tokenization of data, transcoding of media content (e.g., image content, audio content, video content) from one format to another and/or data transformations. Other examples include the addition of metadata to data where the metadata may be generated in various ways, such as by the use of facial recognition techniques to match identities to still images or videos or, generally, by processing data and adding to the data one or more results of the processing. In some embodiments, customers are able to define their own data transformations using an interface of the service provider. In many examples, policies associated with a resource, such as a logical data container define the conditions that, when satisfied, cause the data to be transformed and which may also define how the data is to be transformed. It should also be noted that non-specified data transformations may be performed in addition to specified data transformations (e.g., data transformations specified by policies such as described above and below). Such non-specified data transformations being an artifact of physical data persistence that are outside of the scope of specified data transformations specified by policies (generally, declarations) include, but are not limited to the use of error correcting codes to store data, the use of an erasure encoding scheme or other scheme to increase the durability of stored data.

Figure 16:
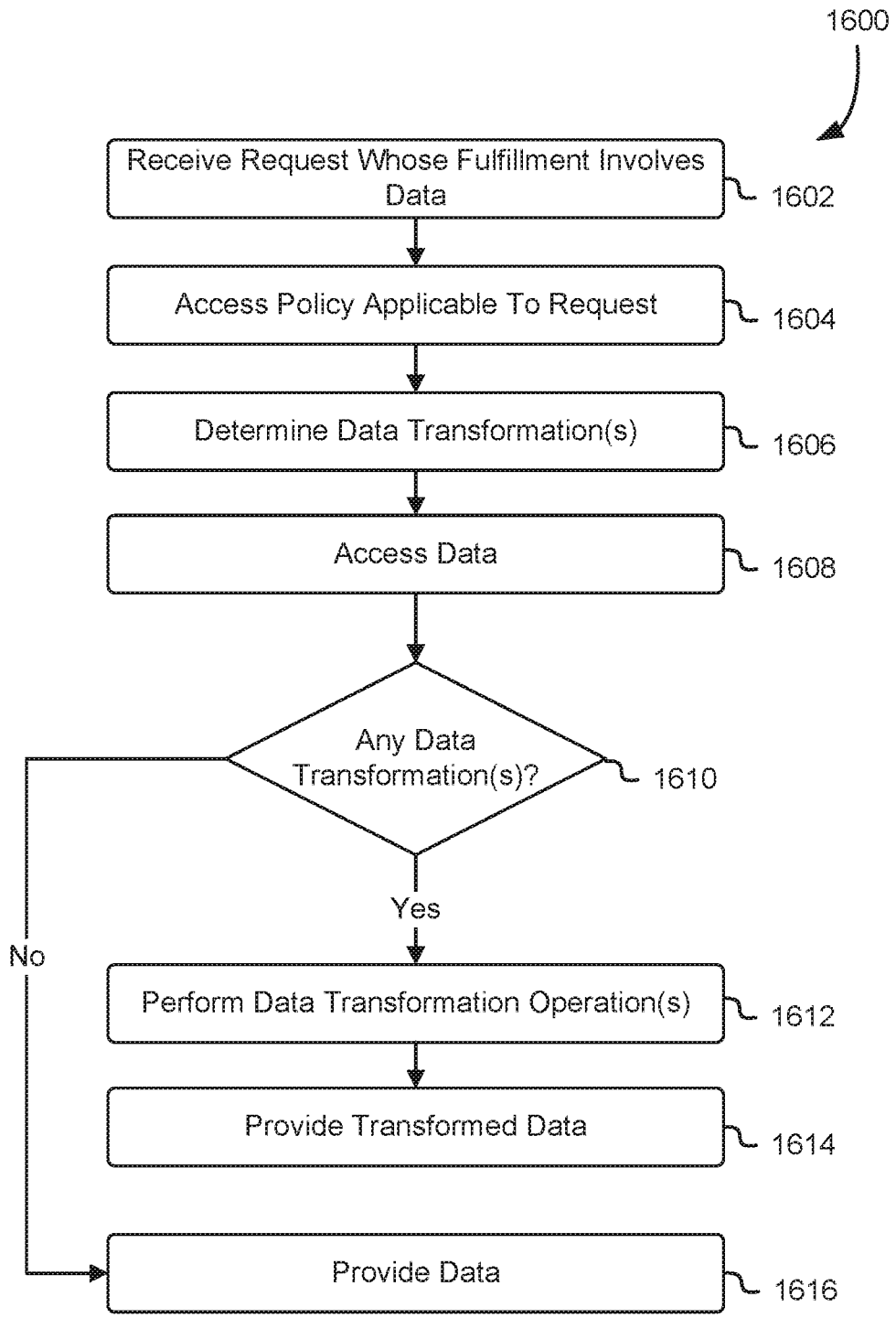
FIG. 16 shows an illustrative example of a process for processing a request involving data in accordance with at least one embodiment.

FIG. 16 shows an illustrative example of a process 1600 which may be used to process a request to a service provider in accordance with various embodiments. The process 1600 may be performed by any suitable system such as by a web server or a collection of servers in a data storage service (system) or generally within a computing environment of a computing resource service provider. In an embodiment the process 1600 includes receiving 1602 a request whose fulfillment involves data. The request may be, for example, a request to store a data object in a data storage service, such as in a logical data container maintained by the data storage service. As another example, the request may be a request to access data stored by a data storage system. Generally any type of request whose fulfillment involves data is considered as being within the scope of the present disclosure. In an embodiment, upon receipt of the request, the process 1600 includes accessing 1604 one or more policies applicable to the request, such as described above. The accessed policies may be used to determine 1606 one or more data transformations on the data.

Determining 1606 the one or more data transformations may be performed in various ways in accordance with various embodiments of the present disclosure. For example, in some embodiments, a policy specifies specific data transformation to be performed. The policy may, for instance, specify a cryptographic algorithm to be performed and/or may specify a mode of the cryptographic algorithm to be performed, such as cipher-block chaining (CBC) or counter mode of the advanced encryption standard (AES). The specified algorithm is not necessarily a symmetric cryptographic algorithm, but may be, for instance, the RSA Encryption Algorithm, or a specific elliptic curve algorithm or another.

As discussed above, the policy may specify an identifier of a key to be used in performance of the cryptographic algorithm if the specified data transformation utilizes a cryptographic key. In some embodiments, however, a policy involving a cryptographic transformation does not specify a cryptographic key. In such instances, a cryptographic key may be inferred (e.g., as a default key for a customer), specified by another policy, or may be generated for the customer. The policy may, generally, specify various parameters that define characteristics of the data transformation that enable the service provider, during fulfillment of a request to which the policy is applicable, to determine one or more transformations to be performed.

In some embodiments, the transformations) specified by a policy are immutable at the time of the policy's definition. In other words, if the policy does not change over time, the transformation(s) that would be applied to data when the policy applies to a request would also not change. As noted, for instance, the policy may specify a specific cryptographic algorithm. In some embodiments, however, a policy specifies a transformation that may change over time while the policy stays the same. In some examples, for instance, the policy specifies one or more conditions for management of data, such as by specifying a regime, which may be a compliance regime. Example compliance regimes include, but are not limited to, the Health Insurance Portability and Accountability Act (HIPAA), International Traffic in Arms Regulations (ITAR), the Payment Card Data Security Standards (PCI DSS) and other various regimes for compliance with one or more laws, regulations and/or industry standards. The requirements for a particular compliance regime may change over time, such as by requiring stronger encryption and, generally, different data transformations to be applied. Accordingly, for such examples, one or more data transformations are not determined specifically at policy creation/editing time, but when the policy is applied to a request (policy application time).

As discussed, determining 1606 any data transformations to be performed for fulfillment of the request and/or determining which transformation(s) to apply may be based at least in part on request features and/or response features. Request features are instances of information in or otherwise determinable by a request. Example request features include, but are not limited to: a source network address of the request, a geographic location corresponding to the source network address (which may be determined by a database or service that maps network addresses to geographic locations), an authenticated principal that submitted the request (which may be determined, e.g., by a session token provided with the request or otherwise), a time of submission and/or receipt of the request, a destination network address to which the address is addressed, a URI or other identifier of a network endpoint in the request and/or others. Response features are features of data responsive to the request prior to performance of at least one data transformation required to be performed prior to providing the response to the requestor. As such, the response features may be features of the data to be transformed. Example response features include, but are not limited to: a pattern matched by the data or a portion (e.g., field) of the data; a measure of a size of the response (e.g., by a number of bytes or number of records), tags associated with the data or a portion thereof, specific information contained in the response and/or others. Patterns that may be matched include, but are not limited to, fields comprising sixteen digits which may correspond to a credit card number or nine digits corresponding to a social security number). Tags may, for instance, associate data in a response with a compliance regime or with something else that, as a result of the association, requires a data transformation.

The data may be accessed 1608 and a determination may be made 1610 whether any data transformations, such as a reverse transformation corresponding to a transformation performed as a result of the data being stored in a logical data container associated with a data transformation policy requiring the transformation, are to be performed. The determination 1610 may be made based at least in part on one or more features of the request, such as an identity of the requestor, a context in which the request was made, a location of the requestor (which may be ascertained from an IP address associated with the request), an amount of data to be provided as a result of fulfilling the request, and/or other features of the request. It should be noted that, as with all processes discussed here in the order of operations may vary in accordance with various embodiments. For example, to fulfill a request, accessing data may be performed in a different order than illustrated, such as before determining whether any applicable data transformations and/or accessing any applicable policy. Accessing 1608 the data may be performed in various ways in accordance with various embodiments and in accordance with the type of request that was received. For example, accessing 1608 data may include obtaining the data from a data storage service, reconstructing data from shards stored by a plurality of data storage devices and/or otherwise obtaining from storage data such as to fulfill a request to read data stored in a data storage system. Accessing the data may also be performed in other ways such as by extracting data from a request that was received 1602 or receiving a stream or other upload of the data, such as where the request is a request to store data using a data storage service.

If it is determined 1610 to perform one or more data transformations, the one or more data transformations that were determined 1606 may be performed 1612 and the transformed data may be provided 1614 such as in response to the request or provided to a system used to fulfill the request such as one or more data storage devices. If it is, however, determined 1610 not to perform any data transformations the data may simply be provided 1616 such as in response to the request or to a system to be used to fulfill the request.

Figure 17:
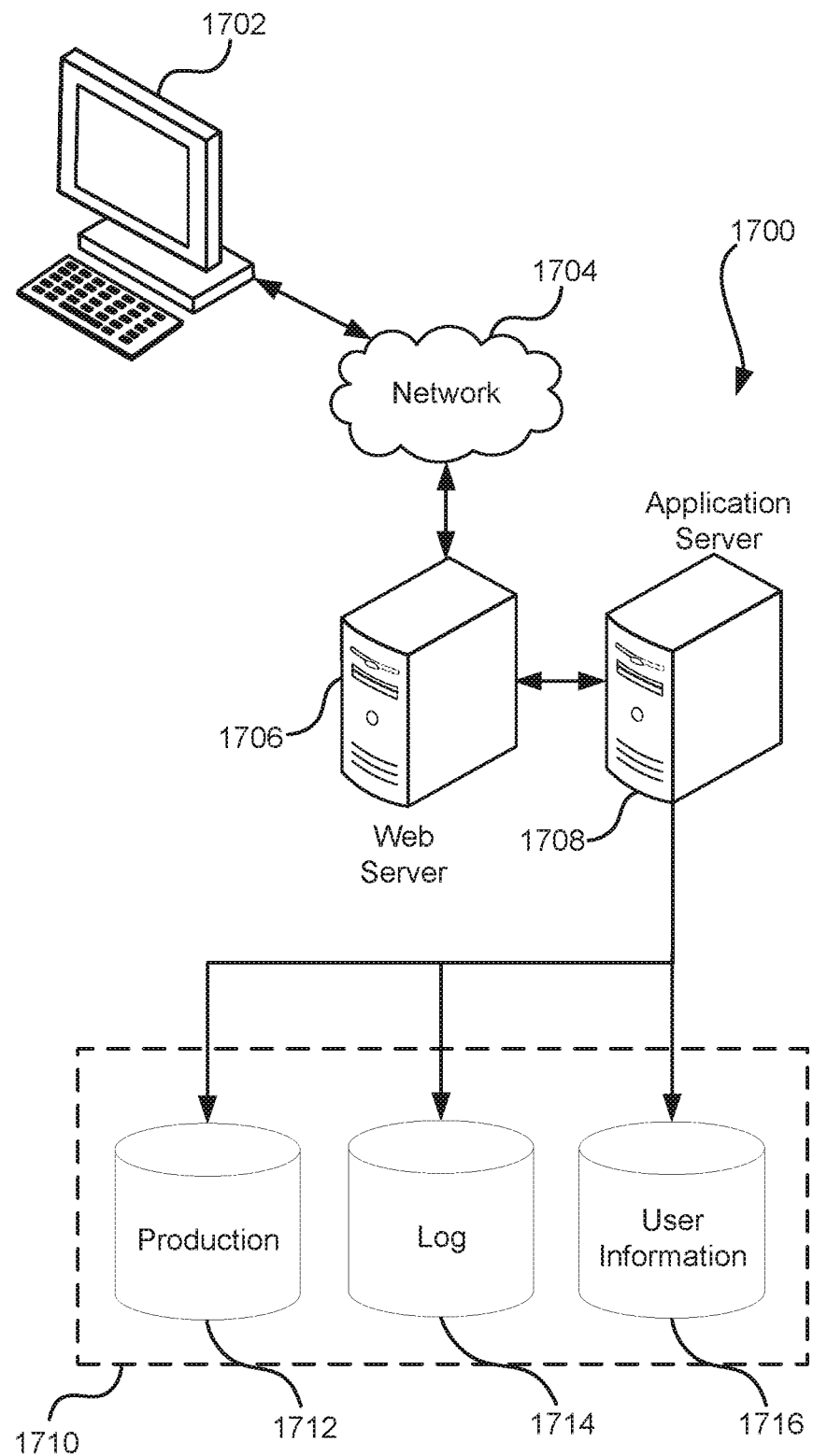
FIG. 17 illustrates an environment in which various embodiments can be implemented.

FIG. 17 illustrates aspects of an example environment 1700 for implementing aspects in accordance with various embodiments. As will be appreciated, although a web-based environment is used for purposes of explanation, different environments may be used, as appropriate, to implement various embodiments. The environment includes an electronic client device 1702, which can include any appropriate device operable to send and/or receive requests, messages or information over an appropriate network 1704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1702 and the application server 1708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1710 can include several separate data tables, databases, data documents, dynamic data storage schemes and/or other data storage mechanisms and media for storing data relating to a particular aspect of the present disclosure. For example, the data store illustrated may include mechanisms for storing production data 1712 and user information 1716, which can be used to serve content for the production side. The data store also is shown to include a mechanism for storing log data 1714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. The application server 1708 may provide static, dynamic or a combination of static and dynamic data in response to the received instructions. Dynamic data, such as data used in web logs (flogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1700 in FIG. 17 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of 13 and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a first request from a client device, the first request including a data object and indicating a logical data container as a storage location for the data object; and
   processing the first request by at least:
      causing a first portion of the data object to be encrypted using a cryptographic key to produce an encrypted data object based at least in part on a policy associated with the logical data container indicating that data objects stored in the logical data container are to be encrypted with the cryptographic key specified for the logical data container, the policy being specified for a customer account of a data storage service that provides the logical data container; and
      storing the encrypted data object in the logical data container.

2. The computer-implemented method of claim 1, wherein the client device is associated with the customer account.

3. The computer-implemented method of claim 1, wherein the cryptographic key is a symmetric key associated with the customer account in a cryptography service.

4. The computer-implemented method of claim 1, wherein the computer-implemented method further comprises receiving a second request indicating an identifier of the cryptographic key, where the cryptographic key is maintained by a cryptography service that performs cryptographic operations using the cryptographic key and is inaccessible to the data storage service.

5. The computer-implemented method of claim 4, wherein the computer-implemented method further comprises:
   obtaining a third request to retrieve the data object from the logical data container;

retrieving the encrypted data object from the logical data container;

causing the encrypted data object to be decrypted to generate the data object; and fulfilling the third request by at least providing the data object.

6. The computer-implemented method of claim 1, wherein the computer-implemented method further comprises:

obtaining a second request to retrieve the data object from the logical data container; and fulfilling the second request by at least providing the encrypted data object.

7. A system, comprising:

one or more processors; and memory that stores executable instructions that, as a result of being executed by the one or more processors, cause the system to:

receive a first request to store a data object in a logical data container; and process the first request by at least:

generating a second request to encrypt the data object using a cryptographic key based at least in part on a policy associated with the logical data container indicating that data objects stored in the logical data container are to be encrypted with the cryptographic key specified for the logical data container, the policy being specified for an account of a data storage service that provides the logical data container;

causing the data object to be encrypted using the cryptographic key thereby generating an encrypted data object as a result of a cryptography service processing the first request; and causing the encrypted data object to be stored within the logical data container.

8. The system of claim 7, wherein the memory further stores executable instructions that, as a result of being executed by the one or more processors, cause the system to generate the logical data container as a result of receiving an indication from a management entity associated with the account of the data storage service.

9. The system of claim 8, wherein the indication is included in an Application Programming Interface (API) call generated based at least in part on a set of interactions between the management entity and a console interface.

10. The system of claim 8, wherein the management entity associated with the account is a member of a set of entities associated with the account and can access the logical data container based at least in part on access information indicated in the policy.

11. The system of claim 10, wherein the policy further indicates an individual symmetric cryptographic key associated with an entity of the set of entities, the individual symmetric cryptographic key used to encrypt data objects stored in the logical data container based at least in part on an operation performed by the entity.

12. The system of claim 7, wherein the memory further stores executable instructions that, as a result of being executed by the one or more processors, cause the system to:

obtain a third request to retrieve the data object from the logical data container;

retrieve the encrypted data object from the logical data container; and generate a determination to decrypt the encrypted data object prior to providing a response to the third request based at least in part on a parameter included in the third request.

13. The system of claim 12, wherein the memory further stores executable instructions that, as a result of being executed by the one or more processors, cause the system to, as a result of the determination, transmit an Applicant Programming Interface (API) call to the cryptography service to decrypt the encrypted data object, the API call including the encrypted data object and an identifier of the cryptographic key indicated in the policy.

14. The system of claim 7, wherein the policy further indicates a log to record transactions with the logical data container within and a symmetric encryption algorithm to use to encrypt a set of data objects.

15. A non-transitory computer-readable storage medium storing thereon executable instructions that, as a result of being executed by one or more processors of a computer system, cause the computer system to:

obtain a first request to associate a policy with a logical data container, the first request generated based at least in part on an interaction between a client device and a console interface of a data storage service providing the logical data container, the policy including at least a requirement that data objects stored in the logical data container are encrypted with a key specified for the logical data container and a customer account of the data storage service; and as a result of obtaining the first request, associate the key with the logical data container such that the data storage service performs various operations including at least:

receiving a second request, through the console interface, to store a first data object in the logical data container; and storing an encrypted data object in the logical data container, the encrypted data object generated based at least in part on an encryption operation performed, by a second computer system distinct from the computer system, using at least the first data object and the key.

16. The non-transitory computer-readable storage medium of claim 15, wherein the executable instructions that cause the computer system to associate the key with the logical data container further include executable instructions that, as a result of being executed by one or more processors, cause the computer system to provision the logical data container.

17. The non-transitory computer-readable storage medium of claim 15, wherein the policy indicates to encrypt the data objects stored in the logical data container with the 256-bit Advanced Encryption Standard (AES) algorithm.

18. The non-transitory computer-readable storage medium of claim 15, wherein the executable instructions that cause the computer system to associate the key with the logical data container further include executable instructions that, as a result of being executed by one or more processors, cause the computer system to transmit a first Application Programming Interface (API) call to a cryptography service, the first API call causing the cryptography service to generate the key on behalf of the client device.

19. The non-transitory computer-readable storage medium of claim 18, wherein the executable instructions that cause the computer system to store the encrypted data object in the logical data container further include executable instructions that, as a result of being executed by one or more processors, cause the computer system to transmit a second API call to the cryptography service to generate the encrypted data object, the second API call including the first data object and an identifier of the key returned in response to the first API call.

20. The non-transitory computer-readable storage medium of claim 15, wherein the executable instructions further include executable instructions that, as a result of being executed by one or more processors, cause the computer system to obtain a third request generated based at least in part on a second interaction between the client device and the console interface, the third request indicating a second logical data container to associate with the policy.

* * * * *